(12) United States Patent
Otani

(10) Patent No.: US 8,473,643 B2
(45) Date of Patent: Jun. 25, 2013

(54) METHOD AND APPARATUS OF TIER STORAGE MANAGEMENT AWARENESS NETWORKING

(75) Inventor: Toshio Otani, Bellevue, WA (US)

(73) Assignee: Hitachi, Ltd., Tokyo (JP)

( * ) Notice: Subject to any disclaimer, the term of this patent is extended or adjusted under 35 U.S.C. 154(b) by 237 days.

(21) Appl. No.: 13/101,502

(22) Filed: May 5, 2011

(65) Prior Publication Data

US 2012/0284431 A1    Nov. 8, 2012

(51) Int. Cl.
*G06F 3/00* (2006.01)
*G06F 5/00* (2006.01)

(52) U.S. Cl.
USPC .................................................. 710/6; 710/40

(58) Field of Classification Search
None
See application file for complete search history.

(56) References Cited

U.S. PATENT DOCUMENTS

| | | | |
|---|---|---|---|
| 2002/0159459 A1* | 10/2002 | Nagatomo et al. | 370/392 |
| 2004/0076161 A1* | 4/2004 | Lavian et al. | 370/395.41 |
| 2006/0253621 A1* | 11/2006 | Brewer et al. | 710/40 |
| 2007/0271391 A1* | 11/2007 | Fujii | 709/240 |
| 2010/0169604 A1* | 7/2010 | Trika et al. | 711/170 |
| 2010/0312888 A1* | 12/2010 | Alon et al. | 709/224 |
| 2011/0320754 A1* | 12/2011 | Ichikawa et al. | 711/165 |

* cited by examiner

*Primary Examiner* — Kris Rhu
(74) *Attorney, Agent, or Firm* — Mattingly & Malur, PC

(57) ABSTRACT

An aspect of the invention is a storage networking system comprising subsystems coupled with a network. The subsystems include an initiator subsystem having an initiator I/O (input/output) control unit, and a plurality of target subsystems each having a target I/O control unit. The initiator subsystem is configured to: place priority information in packet address of an I/O command packet, the priority information being based on a priority table; send the I/O command packet to one or more of the plurality of target I/O control units; and receive a return I/O packet from each of the target I/O control units that received the sent I/O command packet, the return I/O packet having the same priority information. The priority information provided in the priority table is priority of storing I/O data. The I/O data is transferred according to the priority information placed in the packet address of the I/O command packet.

20 Claims, 29 Drawing Sheets

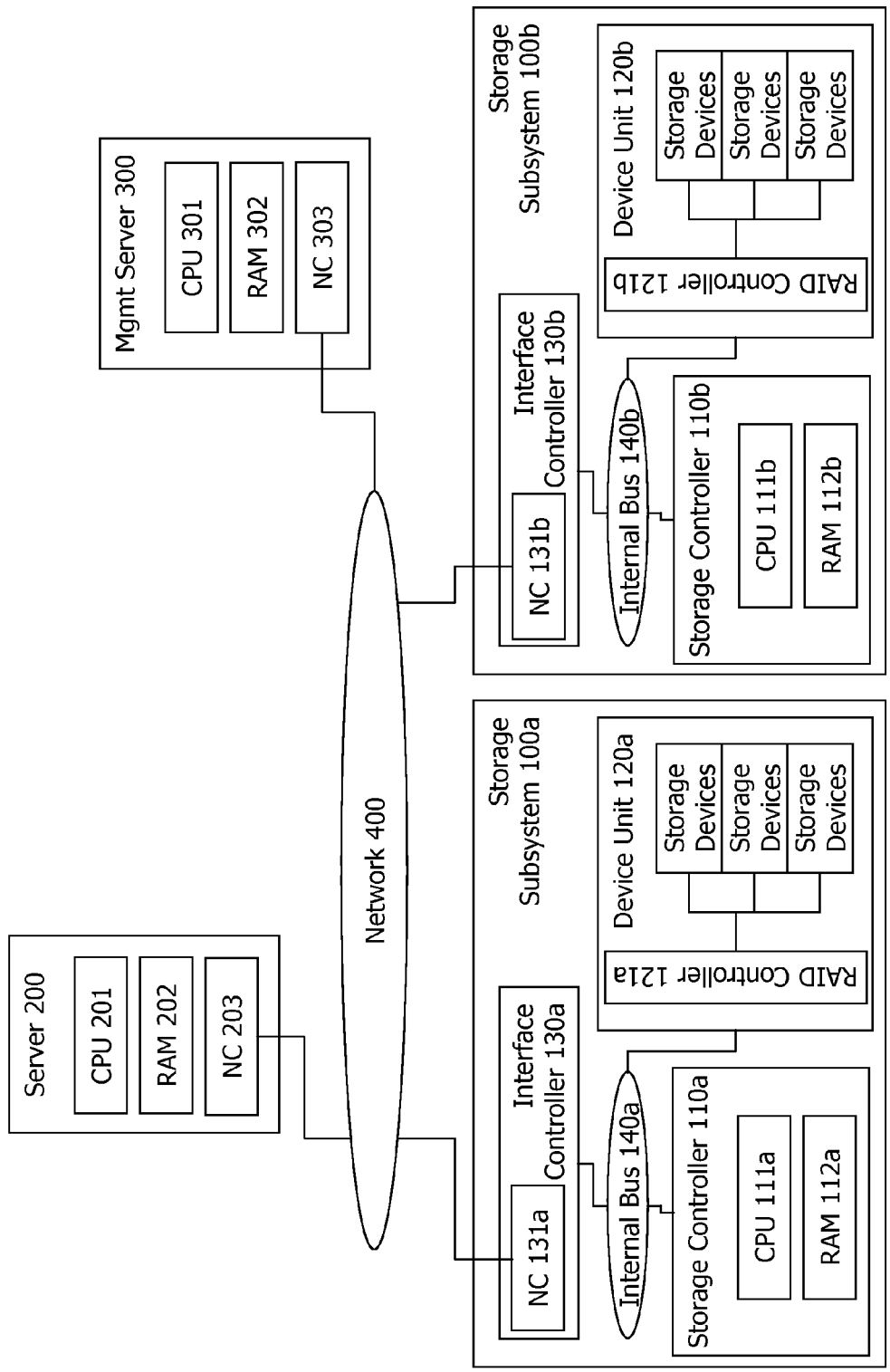
Fig.1 System Configuration

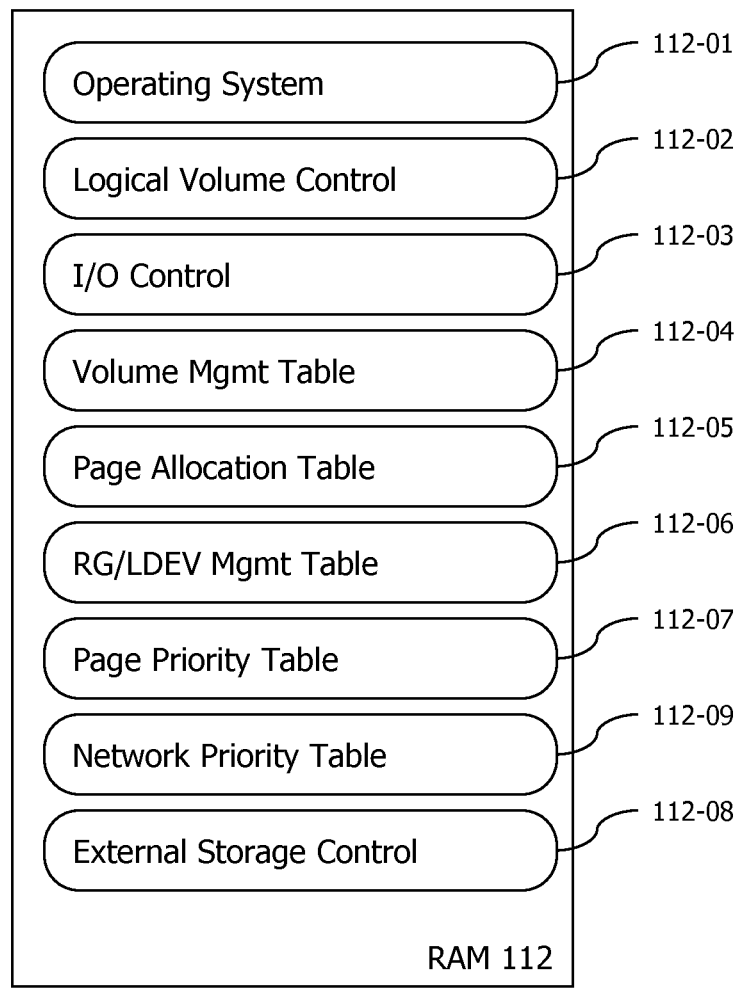
Fig.2 Storage Subsystem Software Configuration

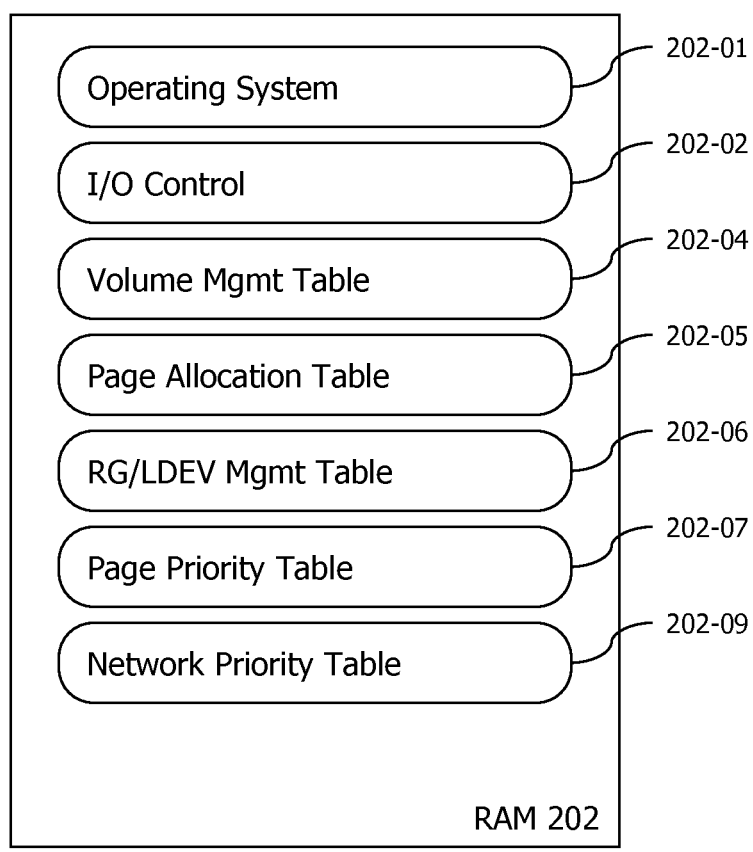
Fig.3 Server Software Configuration

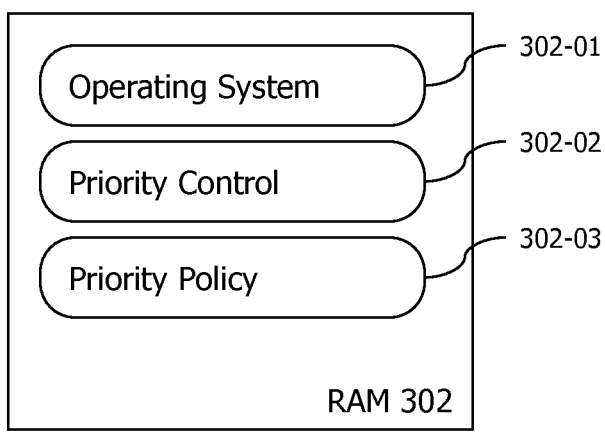
Fig.4 Mgmt Server Software Configuration

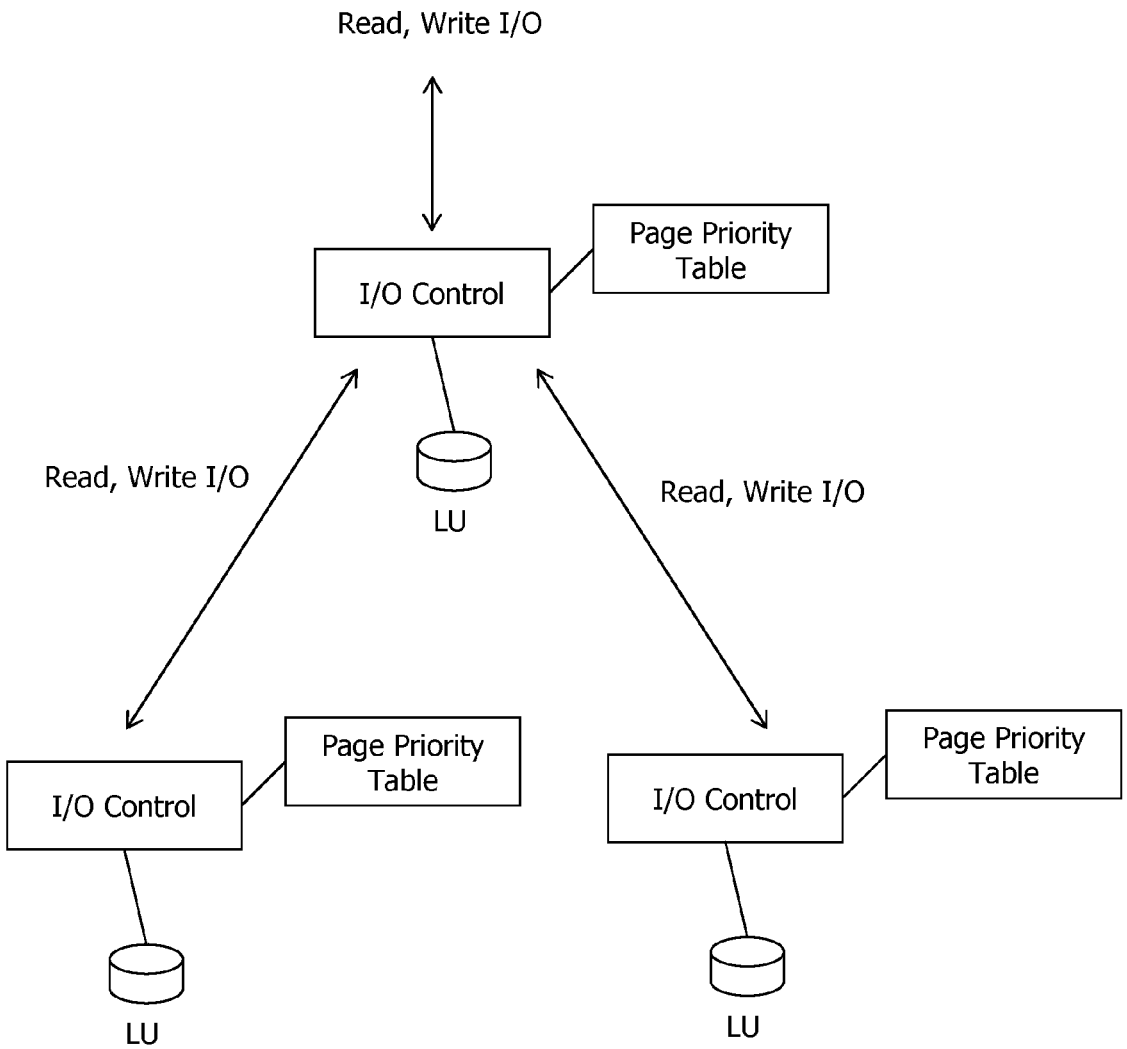
Fig.5 Logical System Configuration

| LU# | LBA | Page # |
|-----|-----------|--------|
| 1 | 0000 – 0015 | 0001 |
| 1 | 0016 – 0031 | 0002 |
| 1 | 0032 – 0047 | 0003 |
| 1 | 0048 – 0063 | 0004 |
| 1 | 0064 – 0079 | 0005 |
| 1 | 0080 – 0095 | 0006 |
| 1 | 0096 – 0111 | 0007 |

— 112-04

Fig.6 Example of Volume Mgmt Table

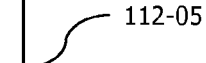
Fig.7 Example of Page Allocation Table

| RG/LDEV # | RAID Level | Storage Device |
|---|---|---|
| 001 | 5 | SSD000 – SSD007 |
| 002 | - | WWPN131b:LU001 |

112-06

Fig.8 Example of RG/LDEV Mgmt Table

| Page # | Priority |
|---|---|
| 0001 | Low |
| 0002 | Low |
| 0003 | Low |
| 0004 | Low |
| 0005 | High |
| 0006 | High |
| 0007 | High |

— 112-07

Fig.9 Example of Page Priority Table

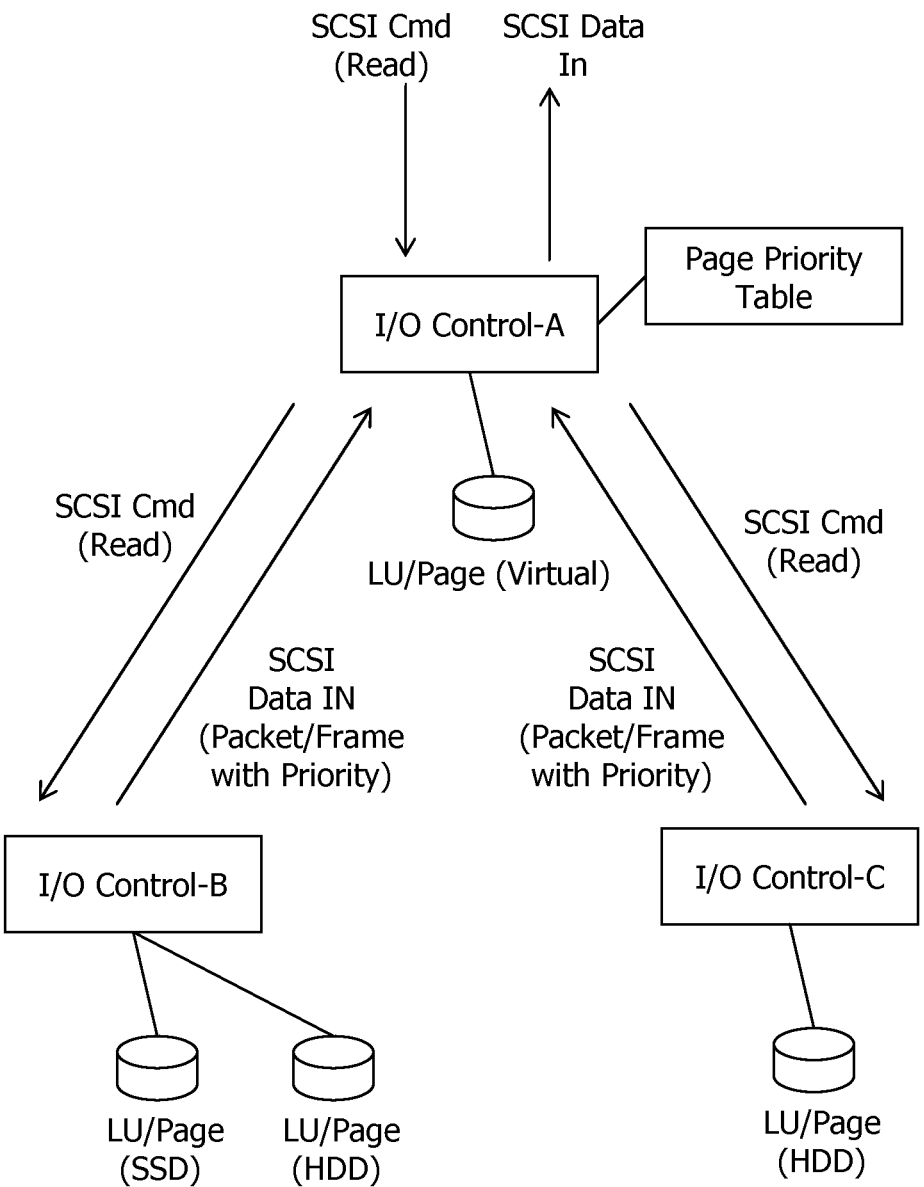
Fig.10 Logical System Configuration (Read)

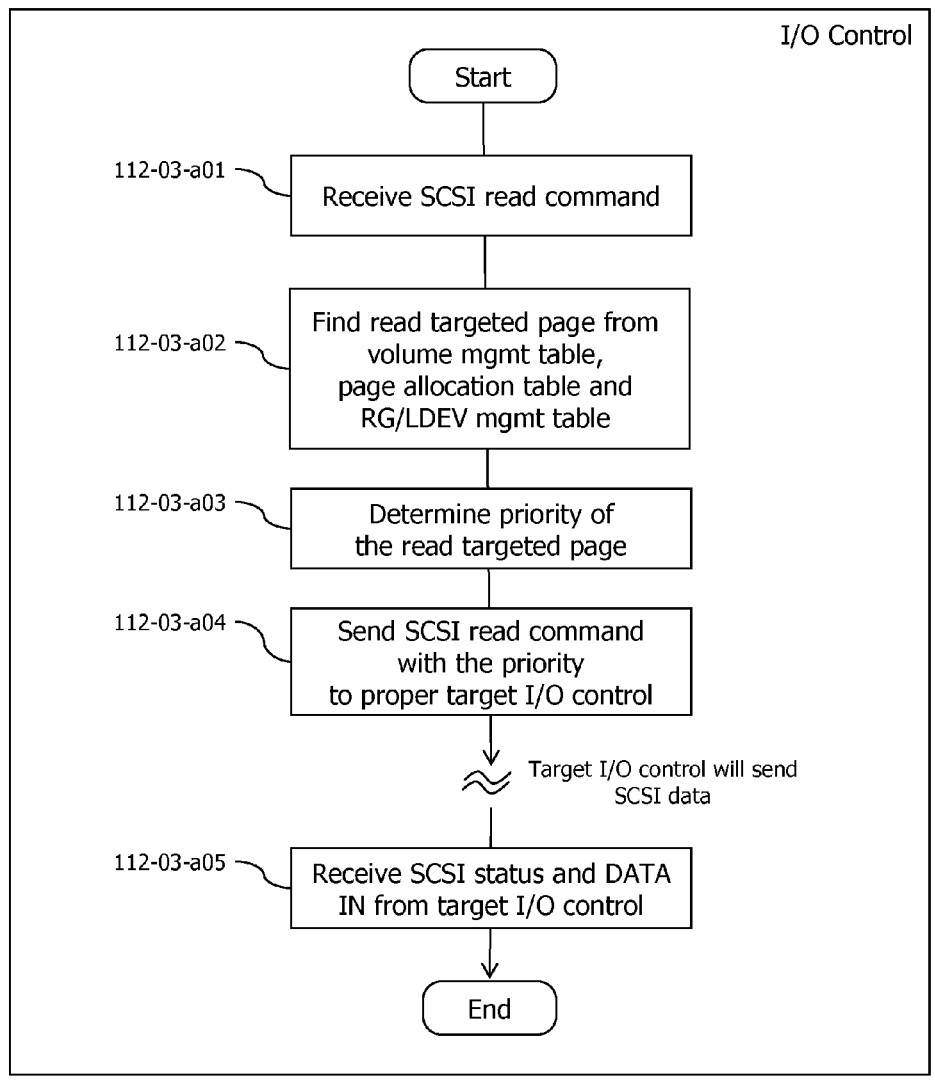
Fig.11a Flowchart – Read (Initiator)

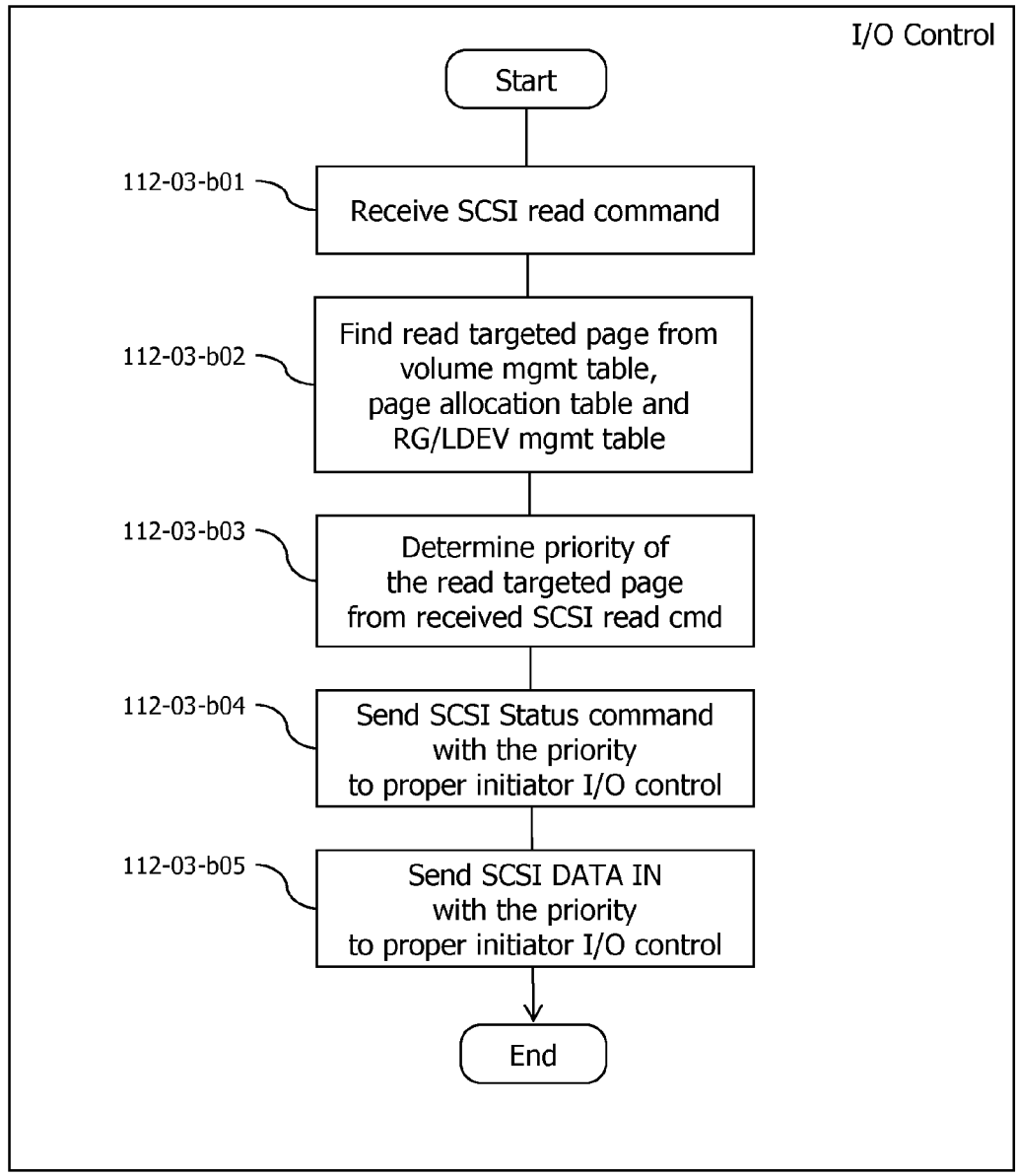
Fig.11b Flowchart – Read (Target)

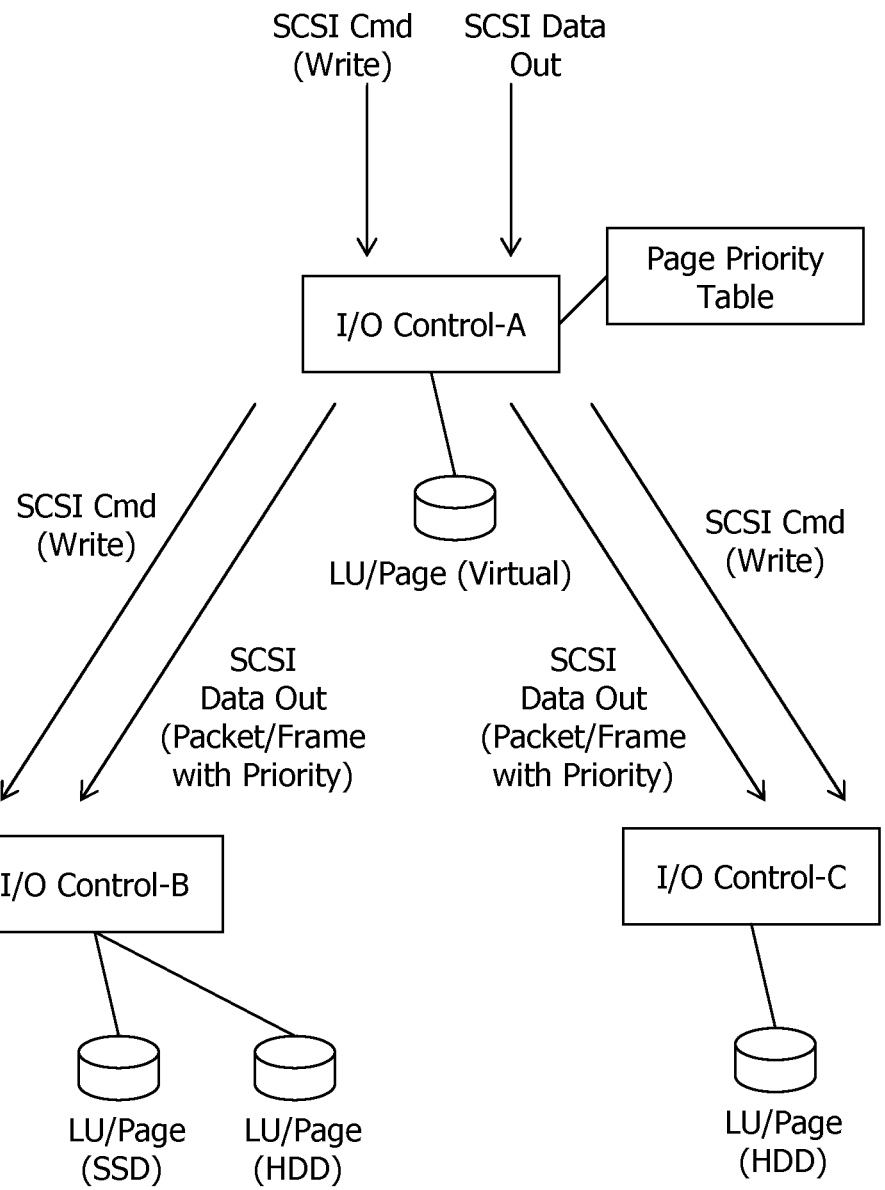
Fig.12 Logical System Configuration (Write)

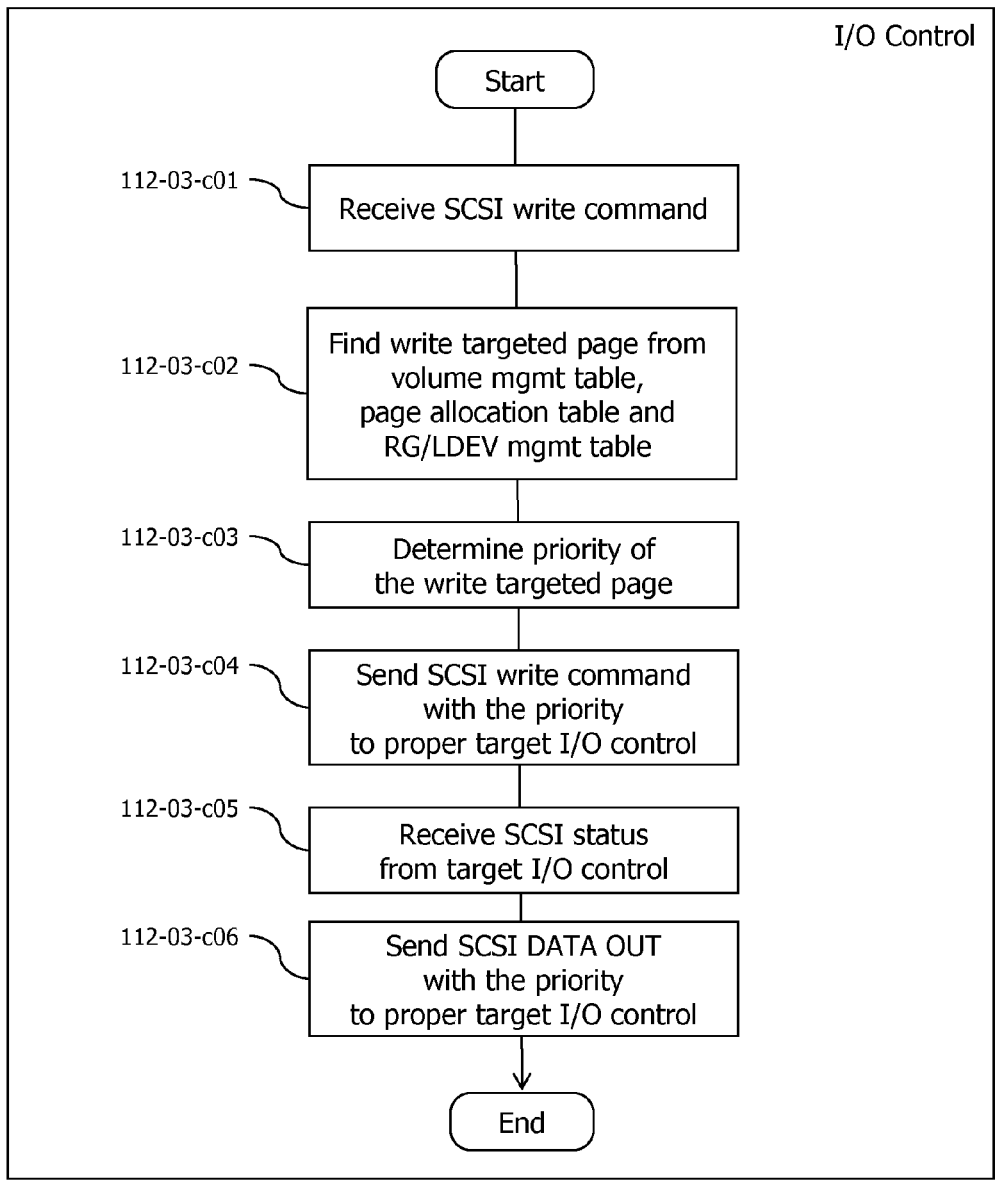
Fig.13 Flowchart – Write (Initiator)

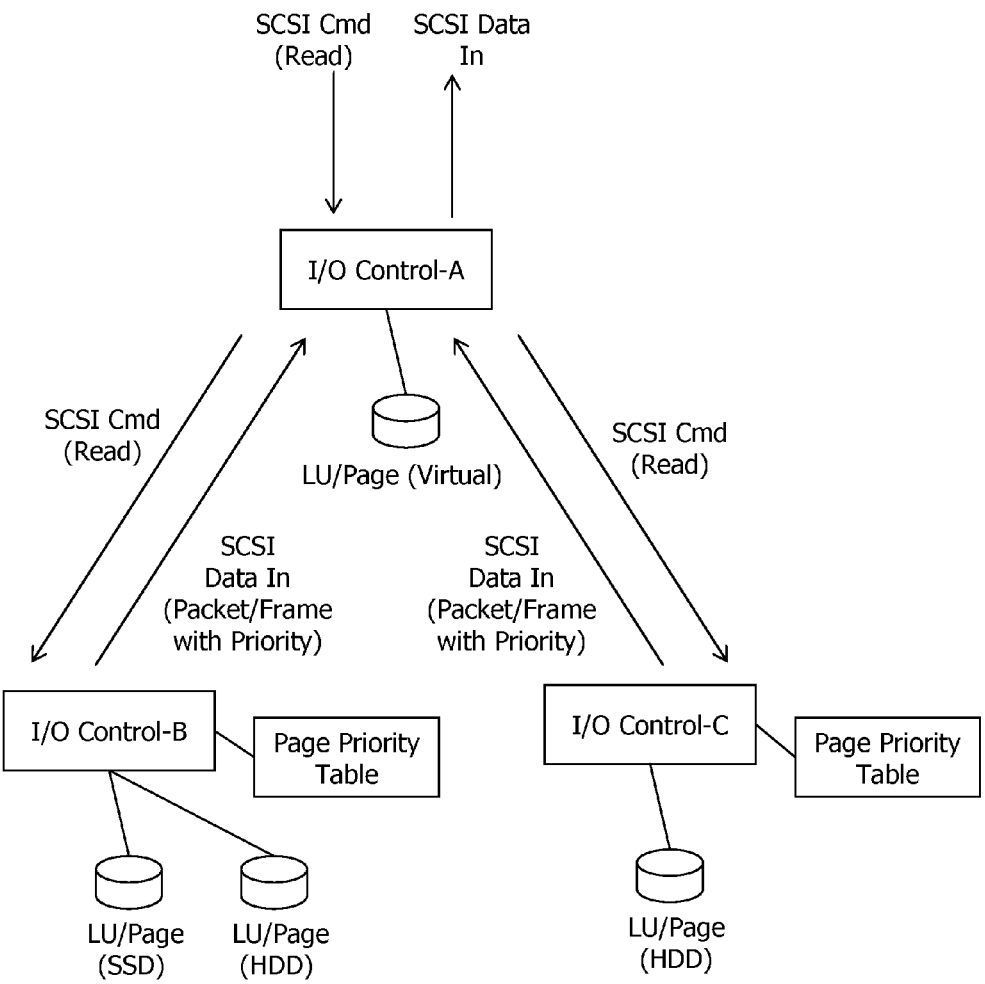
Fig.14 Logical System Configuration (Read, no PPT on Initiator)

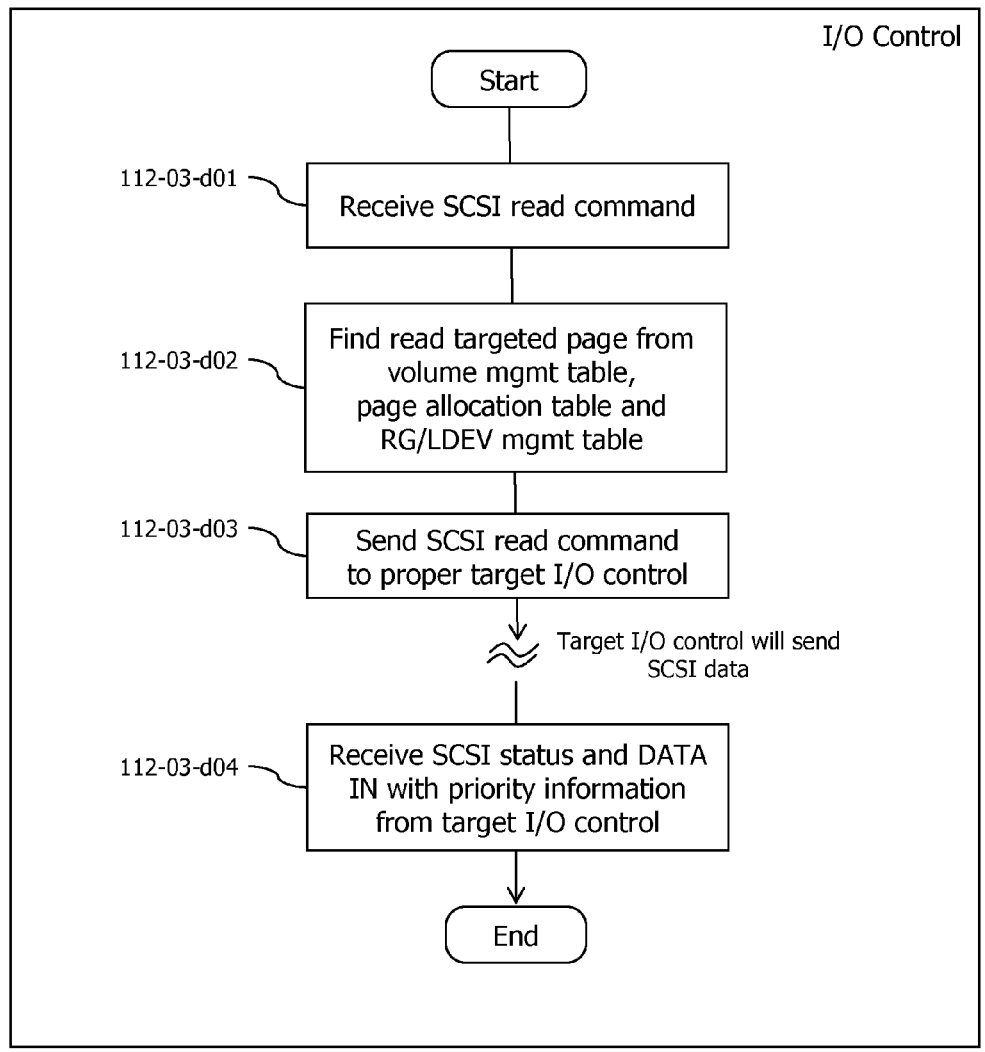
Fig.15a Flowchart – Read (Initiator without PPT)

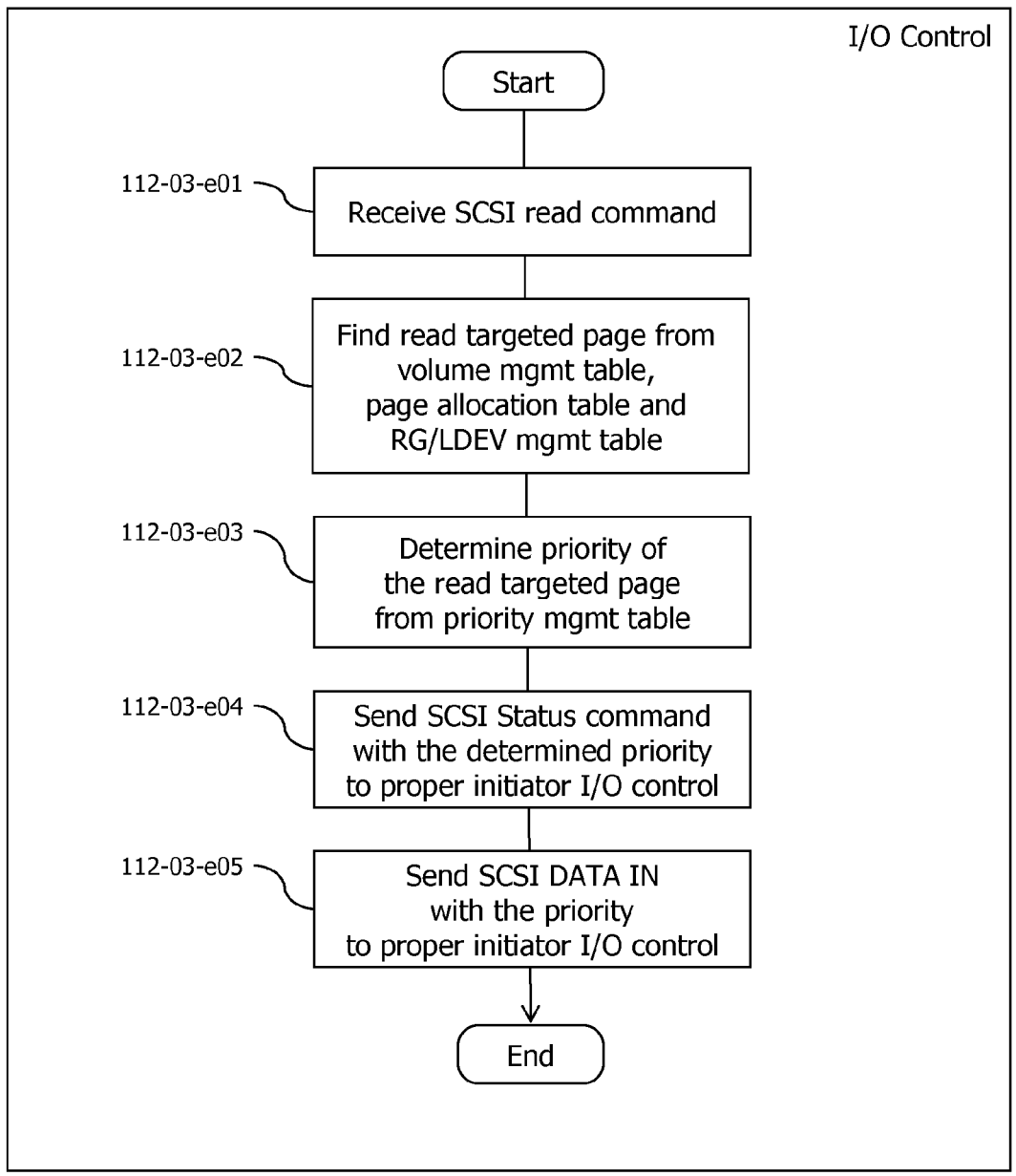
Fig.15b Flowchart – Read (Target with PPT)

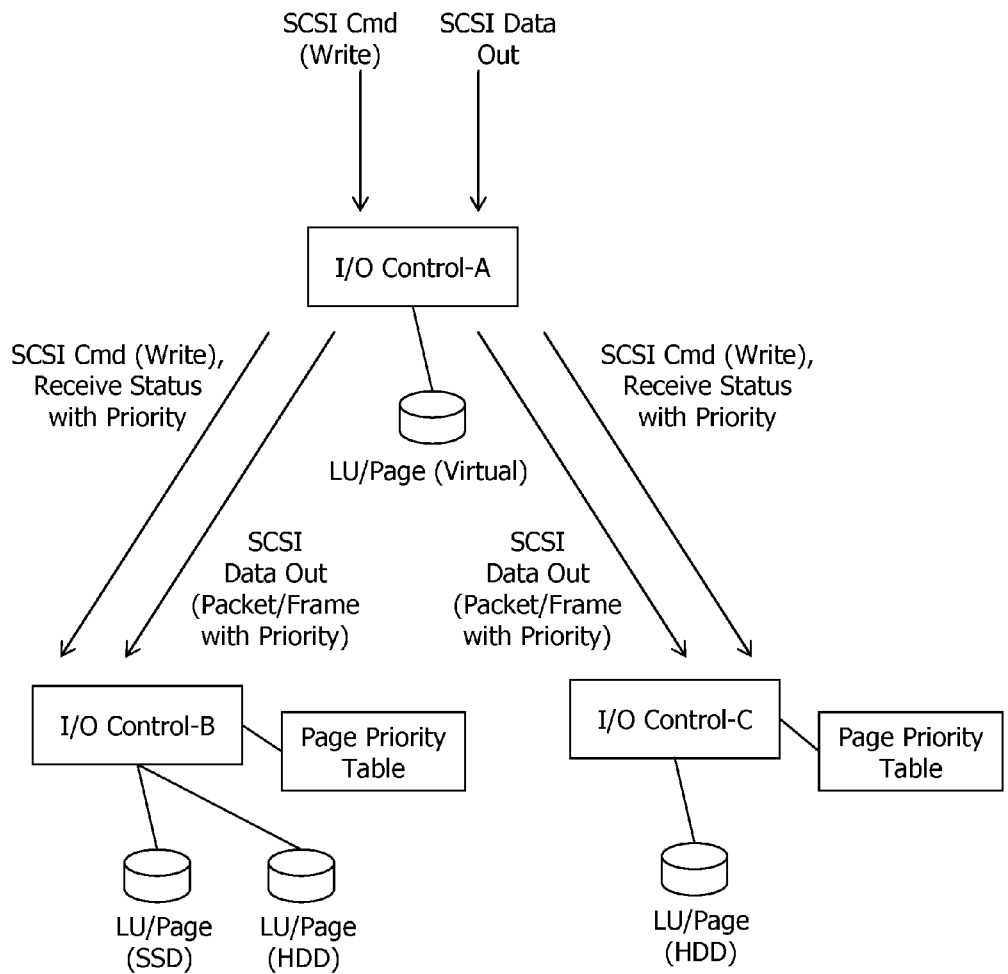
Fig.16 Logical System Configuration (Write, no PPT on Initiator)

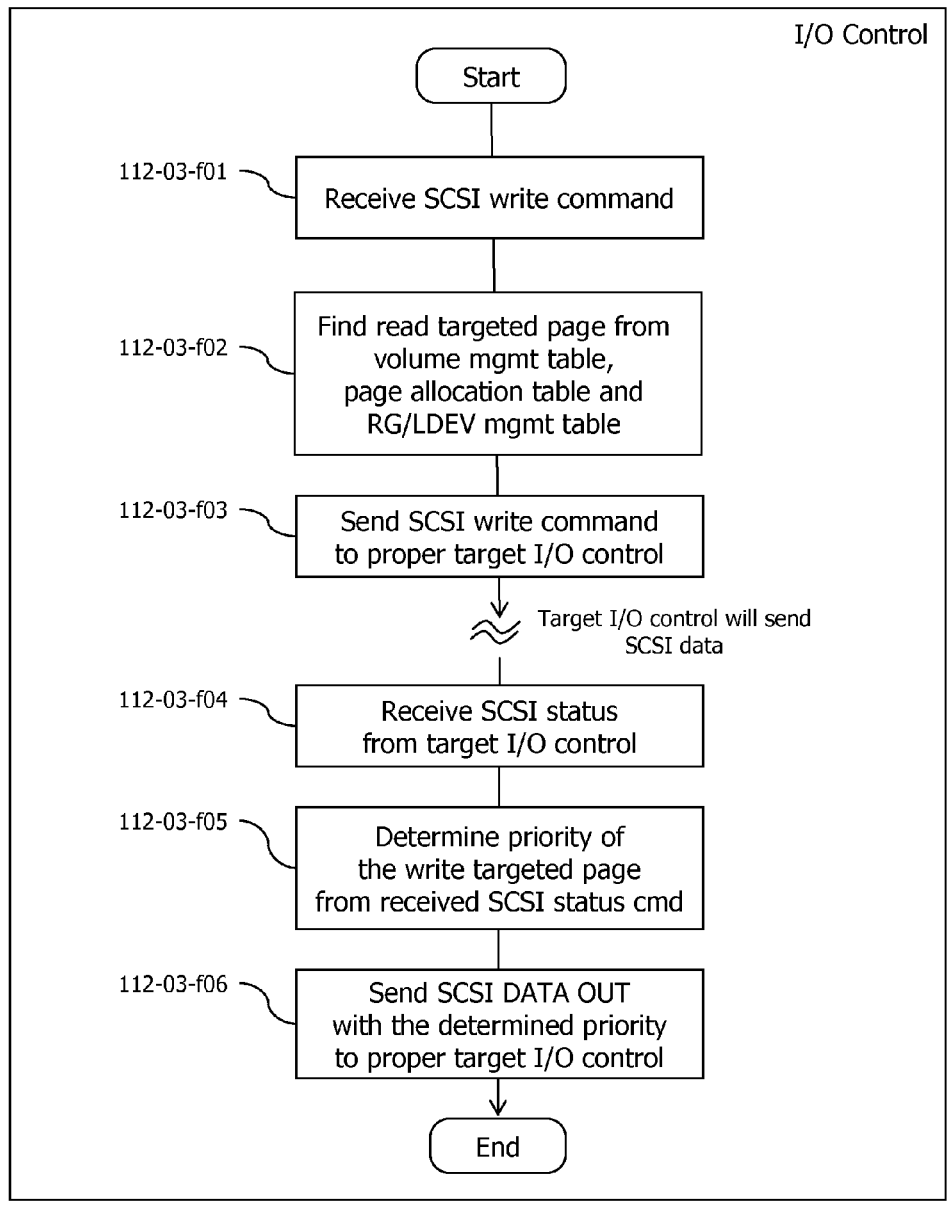
Fig.17a Flowchart – Write (Initiator without PPT)

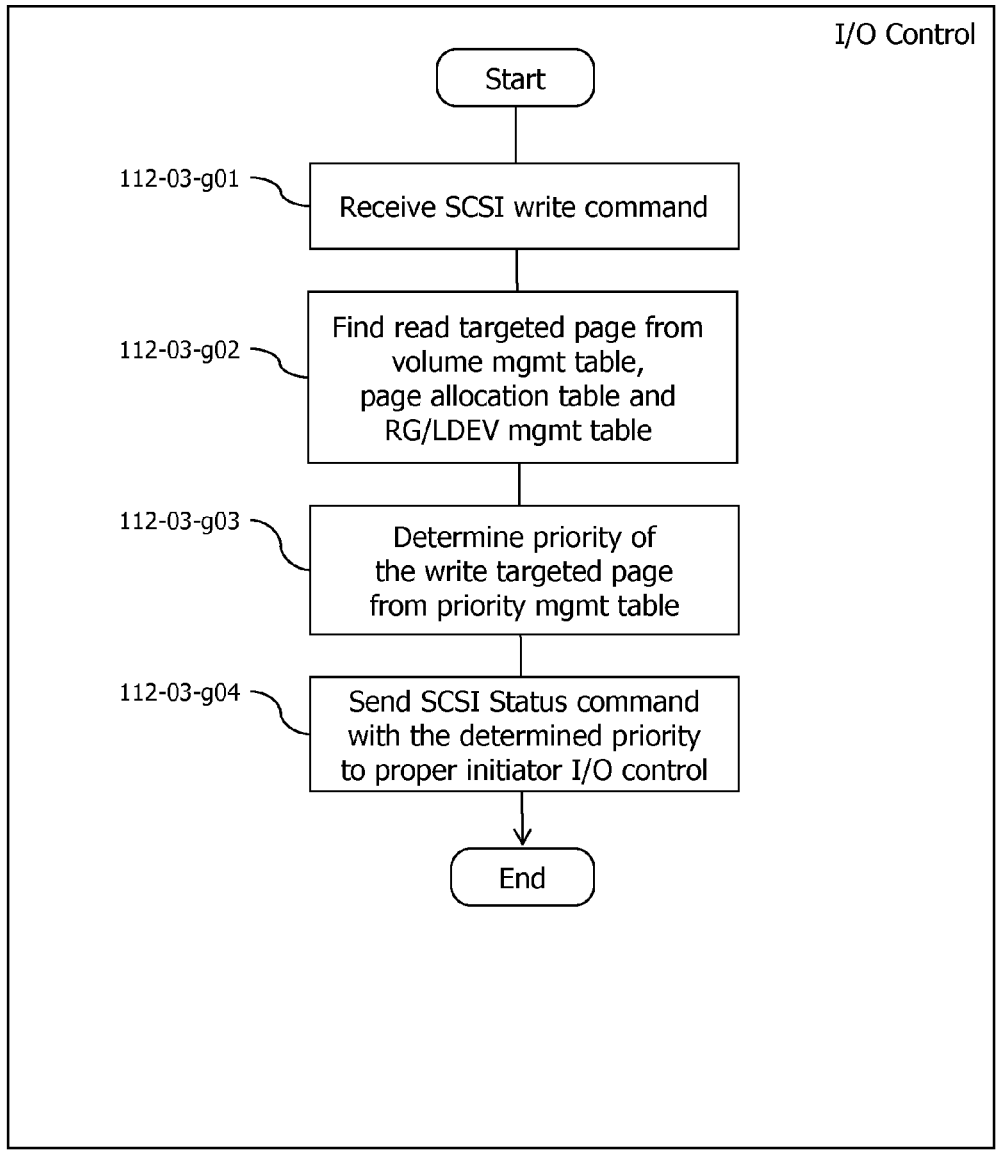
Fig.17b Flowchart – Write (Target with PPT)

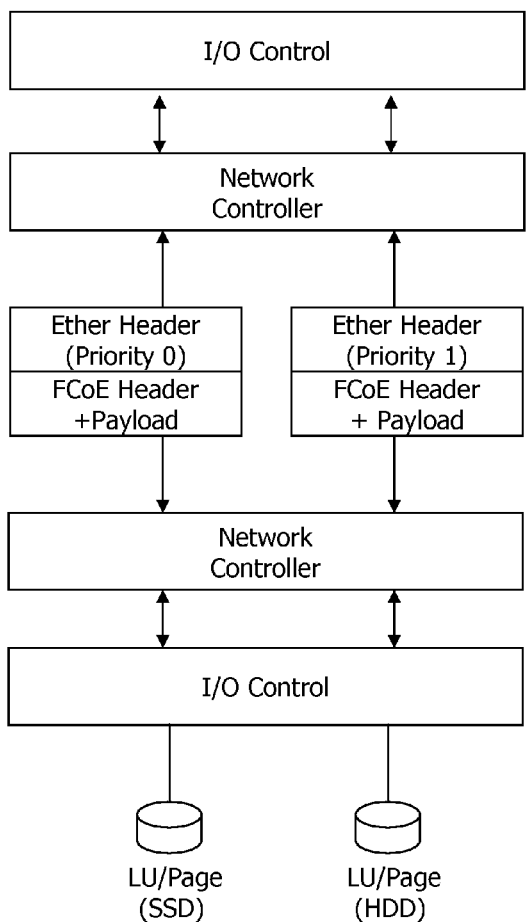
Fig.18 Example of using FCoE

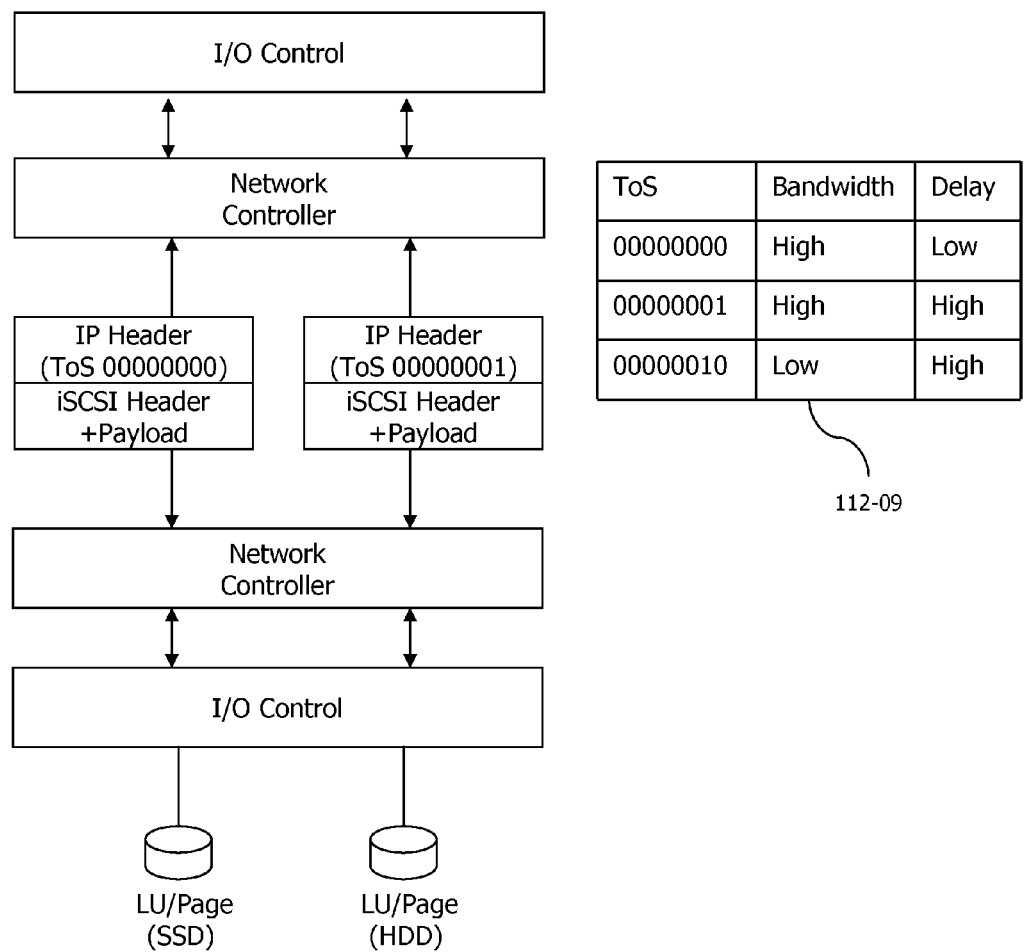
Fig.19 Packet Format (iSCSI)

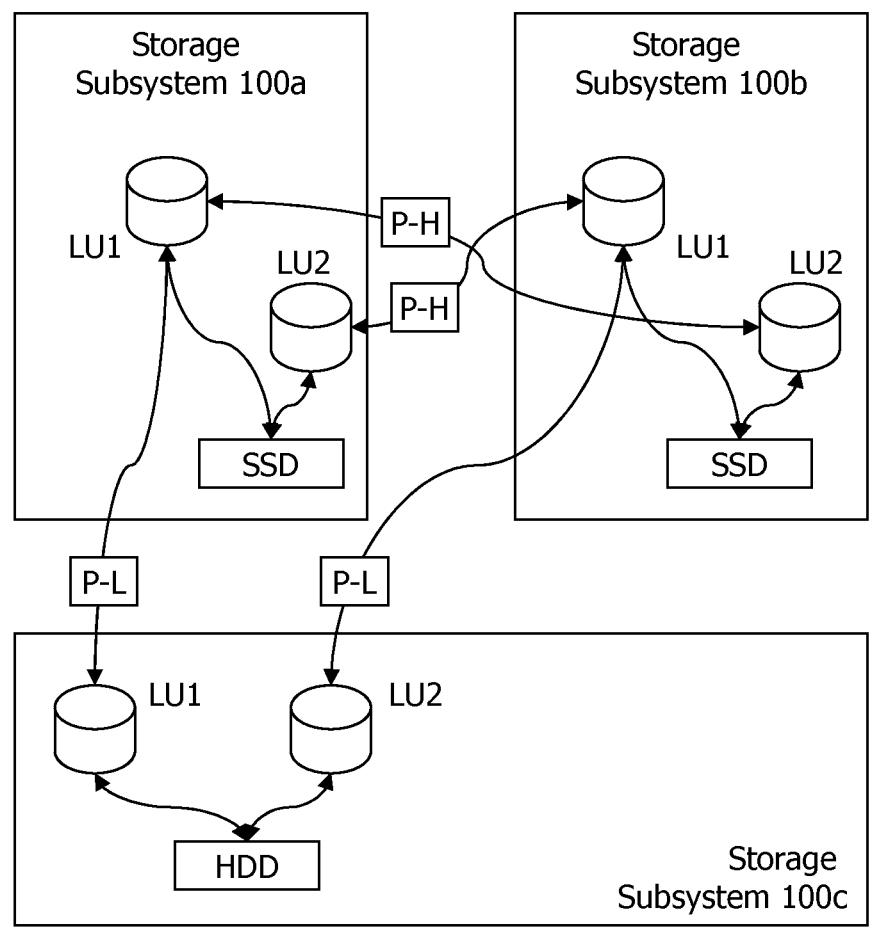
Fig.20 Logical System Configuration (External Storage)

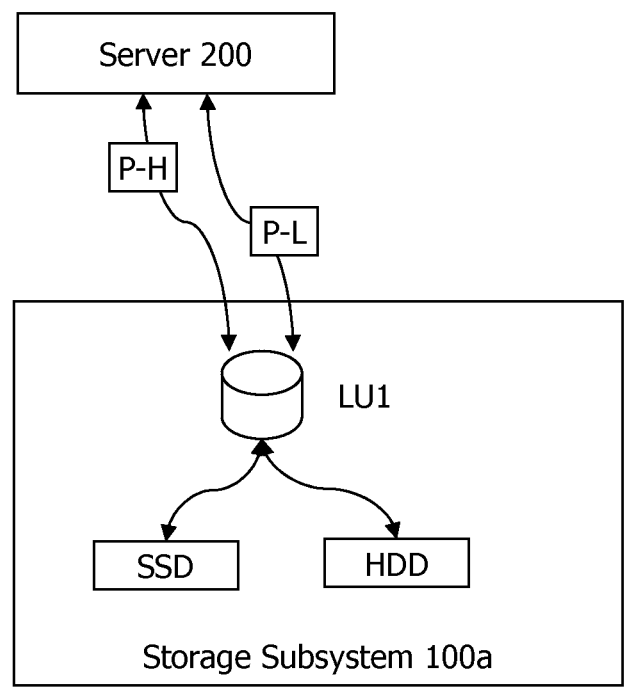
Fig.21 Logical System Configuration (Host to Array I/O)

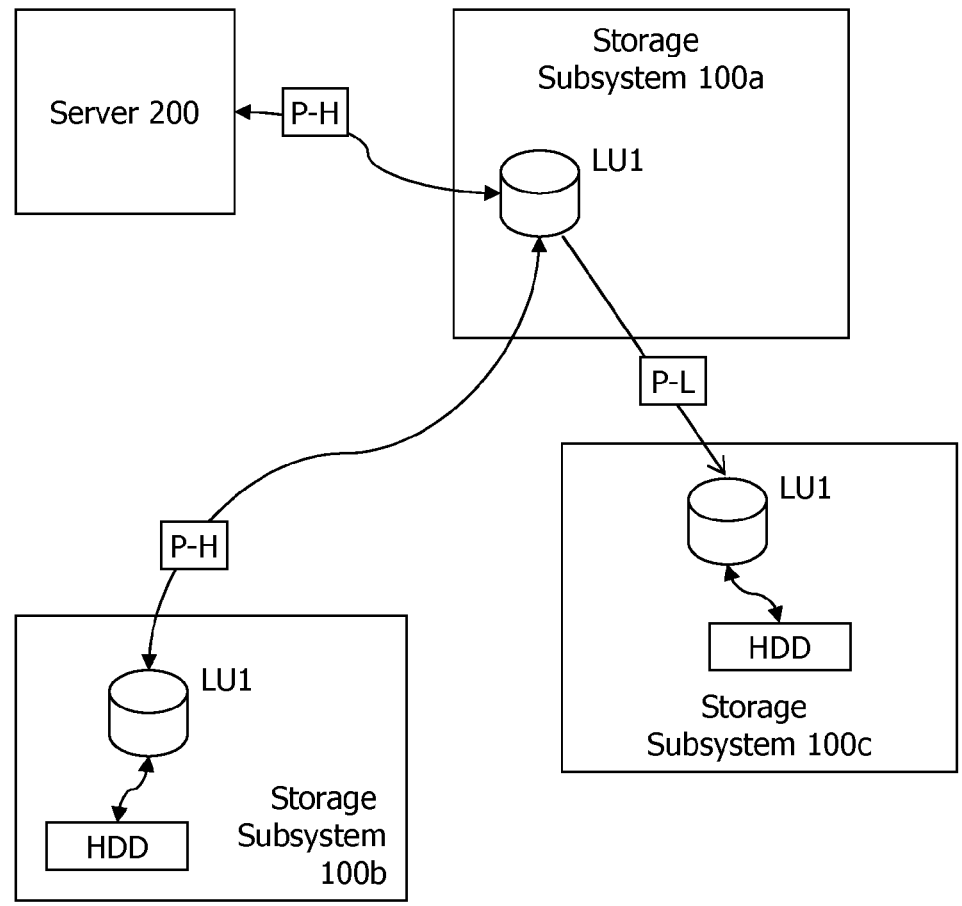
Fig.22 Logical System Configuration (Array features)

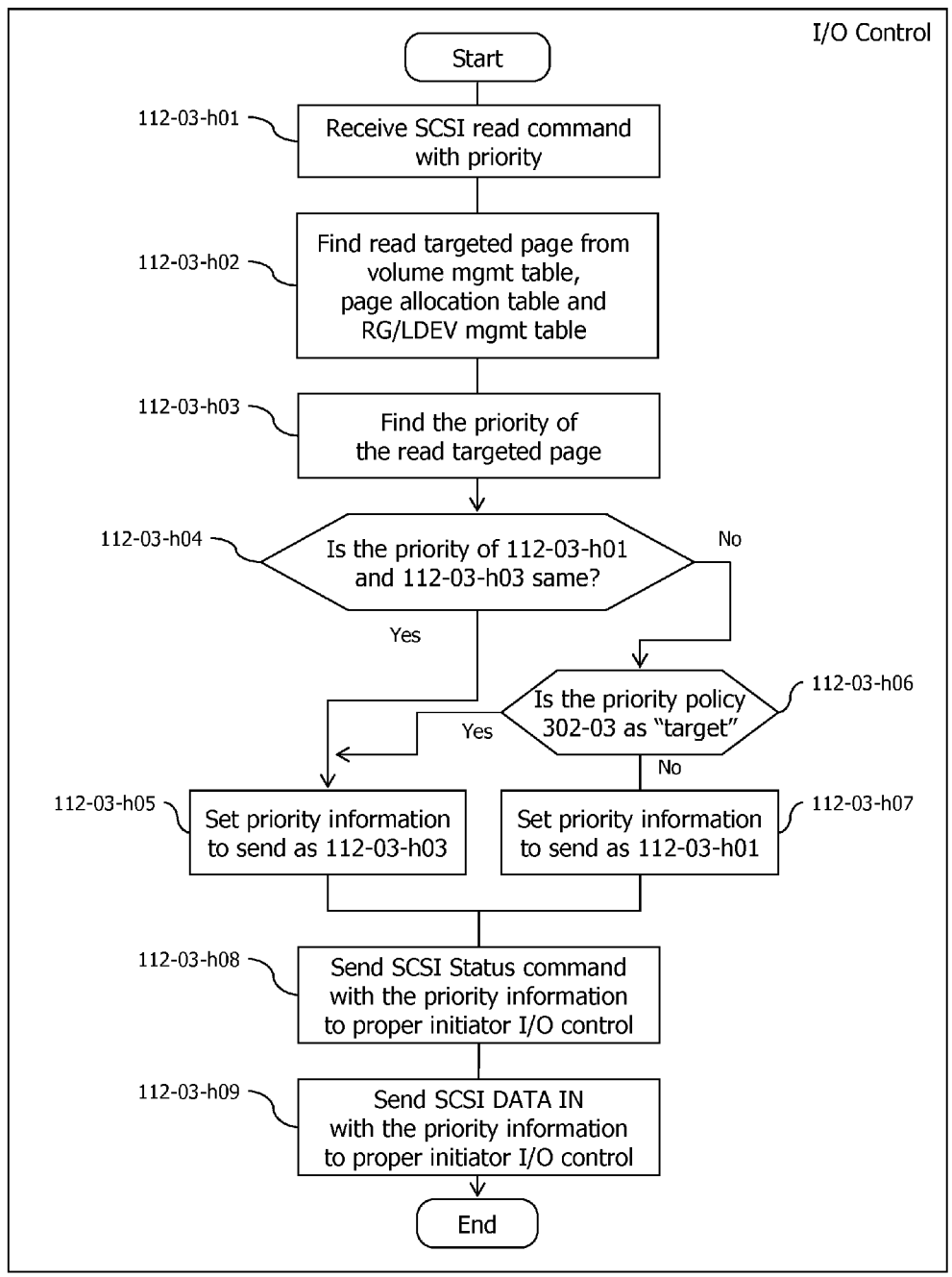
Fig.23a Flowchart – Read (Target)

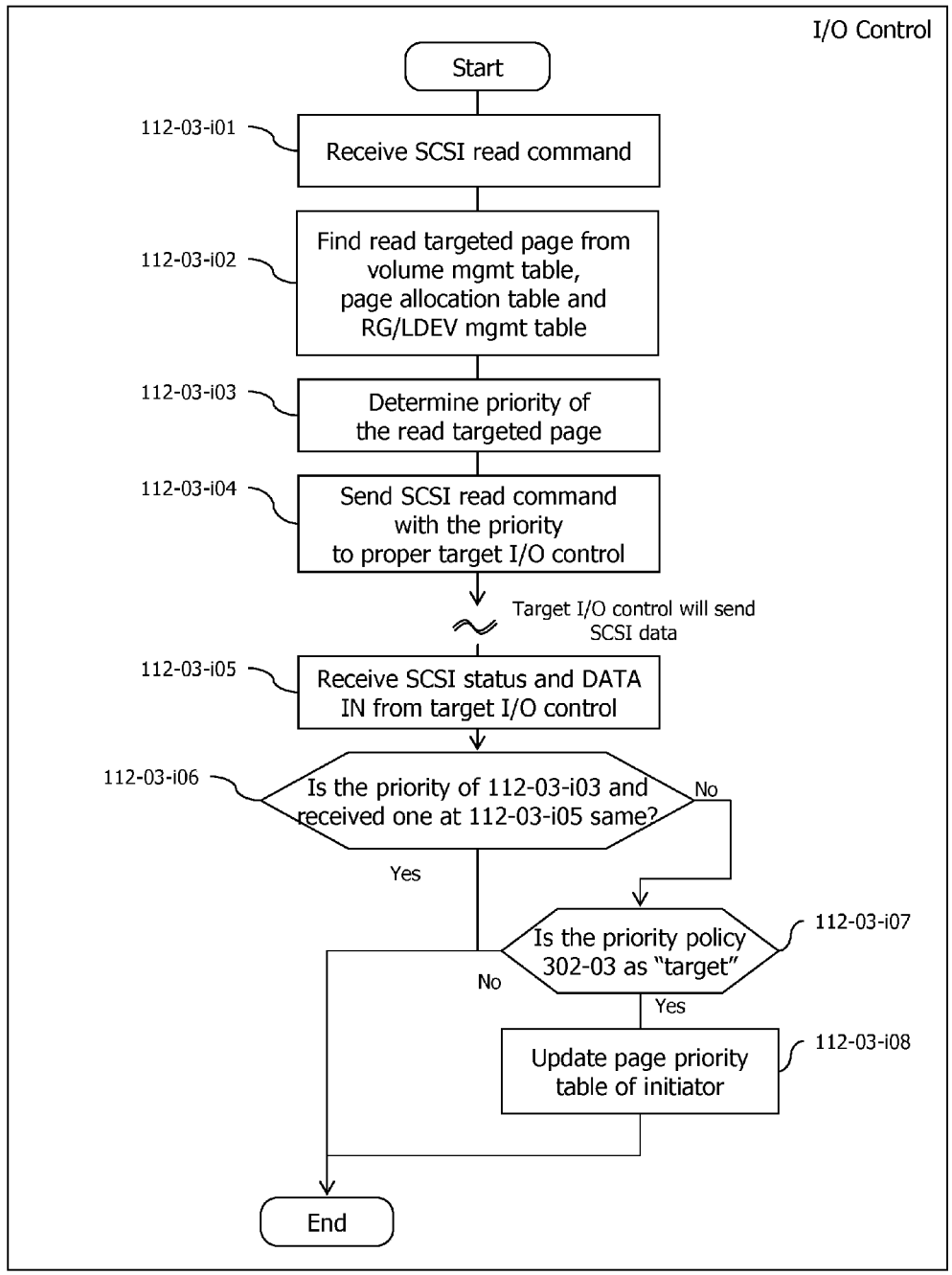
Fig.23b Flowchart – Read (Initiator)

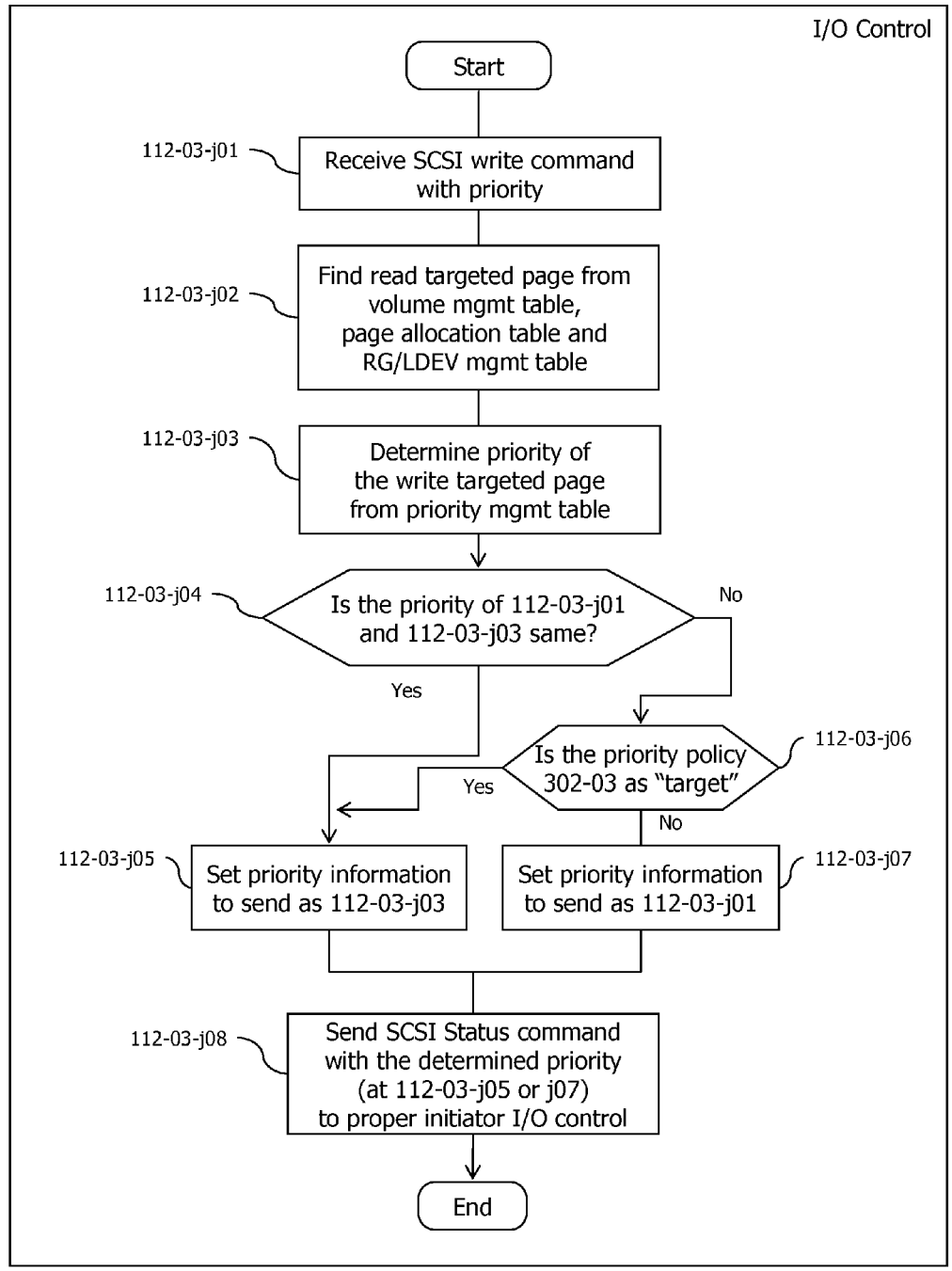
Fig.24a Flowchart – Write (Target)

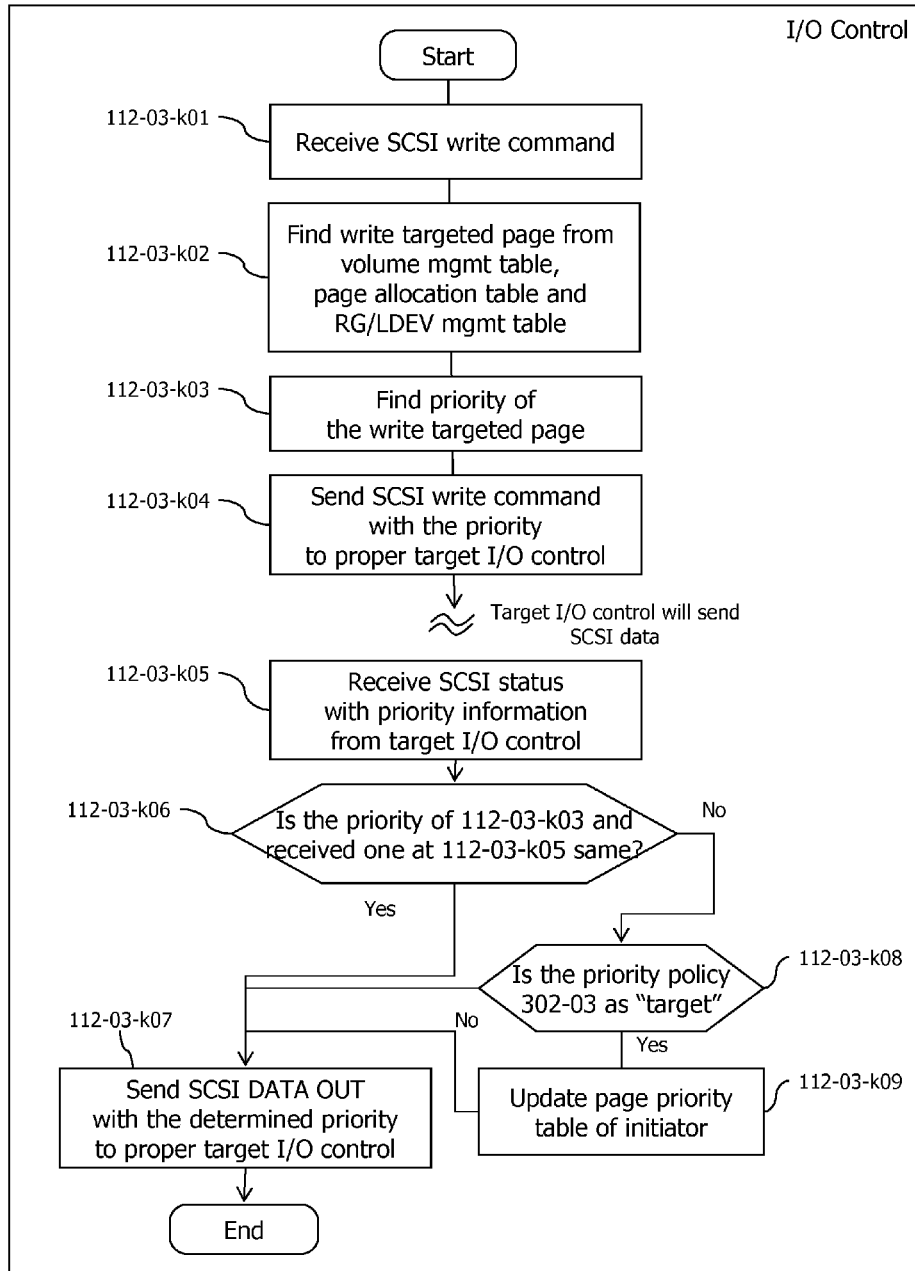
Fig.24b Flowchart – Write (Initiator)

METHOD AND APPARATUS OF TIER STORAGE MANAGEMENT AWARENESS NETWORKING

BACKGROUND OF THE INVENTION

The present invention relates generally to storage subsystems for tiered storage management and, more particularly, to storage I/O (input/output) methods based on tiered storage using the various storage devices such as SSD (Solid State Disk) and HDD (Hard Disk Drive).

Recently, IT (Information Technology) platform has been utilizing new storage devices such as flash which is a SSD. A SSD provides much higher storage I/O performance as compared to conventional storage media such as a HDD. This provides substantial motivation to use tiered storage management to improve the storage I/O performance and optimize the cost. Leveraging SSD and HDD can be used for storage tier management. A mixture of SSD and HDD provides not only more storage I/O performance but also enough capacity for the data. The data which is accessed much should be located on the SSD; in contrast, the data which is not accessed so much (which tends to be much data) should be located on the HDD.

The storage tier management will also require a tier management of storage networking (network quality management). For instance, 30% capacity of much accessed data on SSD and the rest on HDD policy needs 80% bandwidth for SSD I/O and 20% bandwidth for HDD. Network bandwidth should be allocated properly. Additionally, latency of SSD is faster than HDD (SSD is around 50 µs, HDD is around 1000 µs). Therefore, network latency for SSD I/O should be very much lower than that for HDD I/O.

Recently, various I/O configurations such as LAN, SAN (Storage Area Network), IPC (Inter Process Communication) are going to be consolidated. A single network path such as a network interface (port) and network switch gear has to manage various types of I/O configurations. A single network path has to manage and differentiate network qualities (bandwidth, latency, security, etc.) of each type of I/O. Current solution provides priority-based network controlling methods such as IEEE 802.1Qbb and IEEE 802.1Qaz. By using these technologies, an IT platform can prioritize several I/O traffic protocols such as LAN (Local Area Network), SAN, IPC, and the like. However, read/write I/O for SSD and read/write for HDD will be treated the same because all storage I/O will be consolidated as a single I/O path. There is no method to differentiate each tiered storage I/O from the others.

BRIEF SUMMARY OF THE INVENTION

Exemplary embodiments of the invention provide a more efficient storage networking infrastructure when IT platform system uses storage tier management. In specific embodiments, the approach is implemented in a UVM (Universal Volume Manager) configuration. Under the UVM configuration, when the first storage subsystem receives a read/write I/O, it checks the priority of the page/LBA and sends a SCSI read/write I/O with the priority information to the second storage subsystem. Alternatively, when the first storage subsystem receives a read/write I/O, it sends a SCSI read/write command to the second storage subsystem. The second storage subsystem checks the priority of the page/LBA (Logical Block Addressing) and sends back a SCSI status command with the priority information. The first storage subsystem sends a read/write I/O with the priority information coming from SCSI status command. The priority information can be parsed by storage networking for QoS control.

An aspect of the present invention is directed to a storage networking system comprising a plurality of subsystems coupled with a network, the plurality of subsystems including an initiator subsystem having an initiator I/O (input/output) control unit, and a plurality of target subsystems each having a target I/O control unit. The initiator subsystem is configured to: place priority information in packet address of an I/O command packet, the priority information being based on a priority table; send the I/O command packet to one or more of the plurality of target I/O control units; and receive a return I/O packet from each of the target I/O control units that received the sent I/O command packet, the return I/O packet having the same priority information. The priority information provided in the priority table is priority of storing I/O data. The I/O data is transferred according to the priority information placed in the packet address of the I/O command packet.

In some embodiments, priority levels of the priority table are set based on characteristics of storage disks, and the priority level of each page relates to the storage characteristics of the storage disk to which the page is allocated. The I/O command packet includes a read command and the return I/O packet includes data read from the target I/O control unit. The I/O command packet includes a SCSI write command; and, for each target I/O control unit that received the I/O command packet, the return I/O packet includes SCSI status information from the target I/O control unit, and in response to the SCSI status information, the initiator I/O control unit sends SCSI data to be written to the target I/O control unit. The initiator subsystem sends the I/O command packet and receives the return I/O packet before placing the priority information in the packet address of the I/O command packet; and, for each target I/O control unit that received the I/O command packet, the return I/O packet includes the priority information provided from the target I/O control unit, and the priority table is stored in the target subsystem.

In specific embodiments, the initiator subsystem sends the I/O command packet and receives the return I/O packet before placing the priority information in the packet address of the I/O command packet, and an initiator priority table is stored in the initiator subsystem. For each target I/O control unit that received the I/O command packet, the return I/O packet includes priority information provided from a target priority table which is stored in the target subsystem. For each target I/O control unit that received the I/O command packet, if there is inconsistency between the priority information at the initiator priority table and the priority information at the target priority table, the initiator I/O control unit checks a preset priority policy to determine whether to select the initiator priority table or the target priority table and, if the target priority table is selected, the initiator updates the initiator priority table based on the target priority table.

In some embodiments, the I/O command packet includes a read command and the return I/O packet includes data read from the target I/O control unit. The I/O command packet includes a SCSI write command; and, for each target I/O control unit that received the I/O command packet, the return I/O packet includes SCSI status information from the target I/O control unit, and in response to the SCSI status information, the initiator I/O control unit sends SCSI data to be written to the target I/O control unit. The priority information is placed in a header or a body of the I/O command packet. The I/O command packet has a high priority for transferring the I/O command packet which is at least at high as a packet containing I/O data.

Another aspect of the invention is directed to a storage networking method for a system which includes a plurality of subsystems coupled with a network, the plurality of subsystems including an initiator subsystem having an initiator I/O (input/output) control unit, and a plurality of target subsystems each having a target I/O control unit. The method comprises: placing priority information in packet address of an I/O command packet, the priority information being based on a priority table; sending the I/O command packet from the initiator I/O control unit to one or more of the plurality of target I/O control units; and receiving, by the initiator I/O control unit, a return I/O packet from each of the target I/O control units that received the sent I/O command packet, the return I/O packet having the same priority information. The priority information provided in the priority table is priority of storing I/O data. The I/O data is transferred according to the priority information placed in the packet address of the I/O command packet.

In one embodiment, a storage networking system includes a storage I/O initiator feature, a storage I/O target feature, and a storage network. The storage I/O target feature has the capability to serve logical unit (LU) access to the storage I/O initiator feature via the storage network such as SAN. The storage I/O target feature also has the capability to manage different types of storage devices such as SSD (Solid State Disk) and HDD (Hard Disk Drive), and to provide logical volume which consists of logical block portions (such as LBA) of SSD and HDD. The storage I/O initiator feature and/or storage I/O target feature has priority information for each logical block portion, and the storage read/write I/O packet/frame between the storage I/O initiator feature and target feature has the same priority information as the logical block portion does.

In another embodiment, a storage networking system includes a storage subsystem, a server, and a storage network such as SAN. The storage subsystem has the capability to serve LU access to the server via the storage network. The storage subsystem also has the capability to manage different types of storage devices such as SSD and HDD, and to provide logical volume which consists of logical block portions (such as LBA) of SSD and HDD. The server and/or storage subsystem has priority information for each logical block portion, and the storage read/write I/O packet/frame between the server and storage has the same priority information as the logical block portion does.

In another embodiment, a storage networking system includes a storage subsystem A and a storage subsystem B (i.e., two or more storage subsystems), a server, and a storage network such as SAN. The storage subsystems A and B each have the capability to serve LU access to the server and other storage subsystems via the storage network. The storage subsystems A and B each also have the capability to manage different types of storage devices, and to provide logical volume which consists of logical block portions of SSD and HDD. The storage subsystem A provides logical volume which consists of its local logical block portions and external (storage subsystem B's) logical block portions by connecting with each other. The server and/or storage subsystem A and/or B has priority information for each logical block portion, and the storage read/write I/O packet/frame between the server and storage has same priority information as the logical block portion does.

These and other features and advantages of the present invention will become apparent to those of ordinary skill in the art in view of the following detailed description of the specific embodiments.

BRIEF DESCRIPTION OF THE DRAWINGS

FIG. 1 illustrates an example of a hardware configuration of an information system in which the method and apparatus of the invention may be applied.

FIG. 2 illustrates an example of a software configuration of the storage subsystem of FIG. 1.

FIG. 3 illustrates an example of a software configuration of the server of FIG. 1.

FIG. 4 illustrates an example of a software configuration of the management server of FIG. 1.

FIG. 5 shows an example of a logical system configuration illustrating I/O control features.

FIG. 6 shows an example of the volume management table.

FIG. 7 shows an example of the page allocation table.

FIG. 8 shows an example of the RG/LDEV management table.

FIG. 9 shows an example of the page priority table.

FIG. 10 shows an example of a logical system configuration illustrating a read operation from an initiator with the priority table.

FIG. 11a shows an example of a flow diagram illustrating the I/O control process of the read operation for the initiator I/O control.

FIG. 11b shows an example of a flow diagram illustrating the I/O control process of the read operation for the target I/O control.

FIG. 12 shows an example of a logical system configuration illustrating a write operation from an initiator with the priority table.

FIG. 13 shows an example of a flow diagram illustrating the I/O control process of the write operation for the initiator I/O control.

FIG. 14 shows an example of a logical system configuration illustrating a read operation from an initiator without the page priority table (target has the page priority table).

FIG. 15 shows an example of a flow diagram illustrating the I/O control process of the read operation for the initiator I/O control without the page priority table.

FIG. 16 shows an example of a logical system configuration illustrating a write operation from an initiator without the page priority table (target has the page priority table).

FIG. 17a shows an example of a flow diagram illustrating the I/O control process of the write operation for the initiator I/O control without the page priority table.

FIG. 17b shows an example of a flow diagram illustrating the I/O control process of the write operation for the target I/O control without the page priority table.

FIG. 18 shows an example of using FCoE.

FIG. 19 shows an example of packet format for iSCSI.

FIG. 20 shows an example of the storage networking between storage subsystems.

FIG. 21 shows an example of the storage networking between server and storage subsystem.

FIG. 22 shows an example of the storage networking considering the storage I/O characteristics.

FIG. 23a shows an example of a flow diagram illustrating the I/O control process of the read operation for the target I/O control when the initiator and the target have priority information that may be different from one another.

FIG. 23b shows an example of a flow diagram illustrating the I/O control process of the read operation for the initiator I/O control when the initiator and the target have priority information that may be different from one another.

FIG. 24a shows an example of a flow diagram illustrating the I/O control process of the write operation for the target I/O control when the initiator and the target have priority information that may be different from one another.

FIG. 24b shows an example of a flow diagram illustrating the I/O control process of the write operation for the initiator I/O control when the initiator and the target have priority information that may be different from one another.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for providing a more efficient storage networking infrastructure for storage tier management.

System Configuration

FIG. 1 illustrates an example of a hardware configuration of an information system in which the method and apparatus of the invention may be applied. The system includes a storage subsystem 100, a server 200, a management server 300, and a network 400. The storage subsystem 100 has the capability of providing storage volume (LU: logical unit) service via SAN to the server 200. The server 200 runs an OS (operating system) which allows an application program to read and write data on the storage volume in the storage subsystem 100. The management server 300 has the capability to manage priority control among the storage subsystem 100, server 200 and network 400. The network 400 would be Ethernet, Fibre Channel and so on, to provide storage networking capability such as SAN.

The storage subsystem 100 has a storage controller 110, a device unit 120, an interface controller 130, and an internal bus 140. The storage controller 110 has a CPU 111 and a RAM (Random Access Memory) 112 to store and run software program as shown in FIG. 2. The device unit 120 has SCSI/RAID (Redundant Array of Inexpensive Disks) controller and storage devices such as HDD (Hard Disk Drive), SSD (Solid State Drive) to store digital data, and the like. The interface controller 130 has one or more network controllers (NC) such as Ethernet port and Fibre Channel port. One or more storage volumes can be created from RAID protected storage devices and these storage volumes can be exposed by using storage accessing protocol such as Fibre Channel, iSCSI, FCoE (FC over Ethernet) and so on.

FIG. 2 illustrates an example of a software configuration of the storage subsystem 100 of FIG. 1. The RAM 112 has an operating system 112-01. The logical volume control 112-02, I/O control 112-03, and volume management table 112-04 are used to provide storage volume service (FC, iSCSI, FCoE, etc.) to the server 200. The page allocation table 112-05 and RG/LDEV (RAID Group/Logical Device) management table 112-06 manage storage block address allocation of each logical unit. The page priority table 112-07 and network priority table 112-09 manage the priority information of each storage block address and allow priority enabled storage I/O networking. The external storage control 112-08 enables the storage subsystem-A to issue storage I/O to the logical unit on the other storage subsystem-B, and the logical unit of the storage subsystem-B can be managed by the storage subsystem-A.

FIG. 3 illustrates an example of a software configuration of the server 200 of FIG. 1. The server 200 has a CPU 201, a RAM 202, and a NC 203. The RAM 202 has an operating system 202-01 and I/O control 202-02. The RAM 202 may also have logical unit management information such as the volume management table 202-04, page allocation table 202-05, RG/LDEV management table 202-06, page priority table 202-07, and network priority table 202-09.

FIG. 4 illustrates an example of a software configuration of the management server 300 of FIG. 1. The management server 300 has a CPU 301, a RAM 302, and a NC 303. The RAM 302 has an operating system 302-01, a priority control 302-02, and a priority policy 302-03. The priority control 302-02 manages the consistency of priority among the storage subsystem 100, server 200 and network 400. The priority policy 302-03 is used when the system sees priority information inconsistency between initiator I/O control and target I/O control, as explained below (see FIGS. 23a-24b). In the examples below, the priority of the target is selected if the priority policy 302-03 is set to "target" and the priority of the initiator is selected if the priority policy 302-03 is set to "initiator."

I/O Controlling

FIG. 5 shows an example of a logical system configuration illustrating I/O control features. Each I/O control feature gets/receives read and write I/O from some other I/O control feature. Each I/O control manages logical unit (LU). Some have page priority table; some do not. The I/O control with the priority table manages mapping information between priority information and storage block address (page) of LU.

FIG. 6 shows an example of the volume management table. It has columns of LU number, LBA (Logical Block Addressing), and page number. Page is one or more storage block addresses (e.g., LBA) of a storage device such as SSD and HDD. The relationship between page and storage block address can be represented, for instance, in the page allocation table of FIG. 7. The page allocation table has columns of page number, RG/LDEV number, and LBA.

FIG. 8 shows an example of the RG/LDEV management table. It has columns of RG/LDEV #, RAID (Redundant Array of Independent Disks) level, and storage device in RG/LDEV. The storage devices can be physical devices in the same storage subsystem such as SSD and HDD. The storage devices can also be external logical units on some other storage subsystem which can be connected via a SAN. In that case, the storage subsystem can be connected by using external storage control 112-08, for instance.

FIG. 9 shows an example of the page priority table. It has columns of page number and priority level of each page. The priority level in the priority table is set based on the characteristics of the storage disks, and the priority level of each page relates to the storage characteristics of the storage disk to which the page is allocated. The characteristics are treated as the priority level, and the high priority is assigned to the high performance storage device (disk). Typically, a high priority page would be assigned from LBAs on SSD, and low priority page would be assigned from LBAs on HDD. In this embodiment, the system has the independent page priority table. However, the priority level of the page may be acquired from the storage characteristics using the page allocation table of FIG. 7 and the RG/LDEV management table of FIG. 8 without the page priority table.

Read Operation: Initiator has Page Priority Table

FIG. 10 shows an example of a logical system configuration illustrating a read operation from an initiator with the priority table. In this configuration, pages of LU with I/O control-A come from LU/pages of I/O control-B and I/O control-C. The LU includes SSD page and HDD page.

FIG. 11a shows an example of a flow diagram illustrating the I/O control process of the read operation for the initiator I/O control. When I/O control-A receives a SCSI read command (step 112-03-a01), I/O control-A checks the volume management table, page allocation table, and RG/LDEV management table to find the target page of the read command (step 112-03-a02). Then, I/O control-A checks the page priority table to determine the priority of the page (step 112-03-a03). After that, I/O control-A makes storage I/O packet/frame (SCSI read command) with the priority information of the page, and sends the packet/frame to the proper I/O control such as B or C (step 112-03-a04). When I/O control-B (or C) sends back packet/frame of SCSI DATA IN to I/O control-A (which receives the SCIS status and DATA IN from the target I/O control in step 112-03-a05), I/O control-B memorizes the priority information of SCSI read command coming from I/O control-A, and puts the same priority information to the return packet/frame of SCSI DATA IN.

For instance, when I/O control-A receives a SCSI read command to LBA #0065 of LU #1, it can detect the read targeted page is page #0005 (see FIGS. 6 and 7). When I/O control-A checks the RG/LDEV management table (FIG. 8), it detects that page #0005 is stored on RG/LDEV #002, which is an external storage device (WWPN131b:LU001). In this case, it is I/O control-B's LU on SSD. After that, I/O control-A checks the priority information of page #0005 from the page priority table (FIG. 9), and then creates an FCoE or iSCSI packet with the priority information "High" (see, e.g., FIG. 18 and FIG. 19). The SCSI DATA IN packet/frame from I/O control-B to I/O control-A has the same priority information "High" as the SCSI read command from I/O control-A.

FIG. 11b shows an example of a flow diagram illustrating the I/O control process of the read operation for the target I/O control. FIG. 11b is similar to and essentially mirrors the steps in FIG. 11a. The target I/O control receives the SCSI read command in step 112-03-b01, finds the read targeted page from the volume management table, page allocation table, and RG/LDEV management table in step 112-03-b02, determines the priority of the read targeted page from the received SCSI read command in step 112-03-b03, sends the SCSI status command with the priority to the proper initiator I/O control in step 112-03-b04, and sends the SCSI DATA IN with the priority to the proper initiator I/O control in step 112-03-b05.

Write Operation: Initiator has Page Priority Table

FIG. 12 shows an example of a logical system configuration illustrating a write operation from an initiator with the page priority table. In this configuration, pages of LU with I/O control-A come from LU/pages of I/O control-B and I/O control-C. The LU includes SSD page and HDD page.

FIG. 13 shows an example of a flow diagram illustrating the I/O control process of the write operation for the initiator I/O control. When I/O control-A receives a SCSI write command and SCSI DATA OUT (step 112-03-c01), I/O control-A checks the volume management table, page allocation table, and RG/LDEV management table to find the target page of the write command (step 112-03-c02). Then, I/O control-A checks the page priority table to determine the priority of the page (step **112-03-*c*03). After that, I/O control-A makes storage I/O packet/frame (SCSI write command and SCSI DATA OUT) with the priority information of the page, and sends the packet/frame to the proper I/O control such as B or C (step 112-03-*c*04). In step 112-03-*c*05, I/O control-A receives SCSI status from the target I/O control. In step 112-03-*c*06**, I/O control-A sends the SCSI DATA OUT with the priority to the proper target I/O control.

For instance, when I/O control-A receives a SCSI write command to LBA #0065 of LU #1, it can detect the write targeted page is page #0005 (see FIGS. 6 and 7). When I/O control-A checks the RG/LDEV management table (FIG. 8), it detects that page #0005 is stored on RG/LDEV #002, which is an external storage device (WWPN131*b*:LU001). In this case, it is I/O control-B's LU on SSD. After that, I/O control-A checks the priority information of page #0005 from the page priority table (FIG. 9), and then creates an FCoE or iSCSI packet for the SCSI write command and SCSI DATA IN with the priority information "High" (see, e.g., FIG. 18 and FIG. 19).

Read Operation: Target has Page Priority Table

FIG. 14 shows an example of a logical system configuration illustrating a read operation from an initiator without the page priority table (target has the page priority table). In this configuration, pages of LU with I/O control-A come from LU/pages of I/O control-B and I/O control-C. The LU includes SSD page and HDD page.

FIG. 15*a* shows an example of a flow diagram illustrating the I/O control process of the read operation for the initiator I/O control without the page priority table. When I/O control-A receives a SCSI read command (step **112-03-*d*01), I/O control-A checks the volume management table, page allocation table, and RG/LDEV management table to find the target page of the read command (step 112-03-*d*02). Then, I/O control-A makes storage I/O packet/frame (SCSI read command), and sends the packet/frame to the proper I/O control such as B or C (step 112-03-*d*03). In step 112-03-*d*04**, I/O control-A receives the SCSI status and DATA IN with the priority information from the target I/O control.

FIG. 15*b* shows an example of a flow diagram illustrating the I/O control process of the read operation for the target I/O control without the page priority table. I/O control-B (or C) receives the SCSI read command in step **112-03-*e*01 and finds the read targeted page from the volume management table, page allocation table, and RG/LDEV management table in step 112-03-*e*02. When I/O control-B (C) receives the packet/frame, I/O control-B (C) checks the page priority table to determine the priority of the page (step 112-03-*e*03). After that, I/O control-B (C) sends the SCSI status command with the determined priority to I/O control-A (step 112-03-*e*04) and sends back the packet/frame of SCSI DATA IN with the priority information to I/O control-A (step 112-03-*e*05**).

For instance, when I/O control-A receives a SCSI read command to LBA #0065 of LU #1, it can detect the read targeted page is page #0005 (see FIGS. 6 and 7). When I/O control-A checks the RG/LDEV management table (FIG. 8), it detects that page #0005 is stored on RG/LDEV #002, which is an external storage device (WWPN131*b*:LU001). In this case, it is I/O control-B's LU on SSD. After that, I/O control-A creates an FCoE or iSCSI packet and sends it to I/O control-B. I/O control-B checks its priority information of the page from the page priority table (FIG. 9), and then creates an FCoE or iSCSI packet for SCSI DATA IN with the priority information "High" (see, e.g., FIG. 18 and FIG. 19).

Write Operation: Target has Page Priority Table

FIG. 16 shows an example of a logical system configuration illustrating a write operation from an initiator without the page priority table (target has the page priority table). In this configuration, pages of LU with I/O control-A come from LU/pages of I/O control-B and I/O control-C. The LU includes SSD page and HDD page.

FIG. 17*a* shows an example of a flow diagram illustrating the I/O control process of the write operation for the initiator I/O control without the page priority table. When I/O control-A receives a SCSI write command (step **112-03-*f*01), I/O control-A checks the volume management table, page allocation table, and RG/LDEV management table to find the target page of the read command (step 112-03-*f*02). Then, I/O control-A makes storage I/O packet/frame (SCSI write command), and sends the packet/frame to the proper I/O control such as B or C (step 112-03-*f*03**).

FIG. 17*b* shows an example of a flow diagram illustrating the I/O control process of the write operation for the target I/O control without the page priority table. When I/O control-B (C) receives the packet/frame (step **112-03-*g*01), I/O control-B (C) finds the read targeted page from the volume management table, page allocation table, and RG/LDEV management table (step 112-03-*g*02), and checks the page priority table to determine the priority of the page (step 112-03-*g*03). After that, I/O control-B (C) sends back the packet/frame of the SCSI status command with the priority (step 112-03-*g*04). When I/O control-A receives the SCSI status command (should be writable condition, such as "GOOD") in step 112-03-*f*04, I/O control-A determines the priority of the write targeted page from the received SCSI status command (step 112-03-*f*05), and creates and sends packet/frame of SCSI DATA OUT with the same priority information as the SCSI status command had (step 112-03-*f*06**).

For instance, when I/O control-A receives a SCSI write command to LBA #0065 of LU #1, it can detect the write targeted page is page #0005 (see FIGS. 6 and 7). When I/O control-A checks the RG/LDEV management table (FIG. 8), it detects that page #0005 is stored on RG/LDEV #002, which is an external storage device (WWPN131*b*:LU001). In this case, it is I/O control-B's LU on SSD. After that, I/O control-A creates an FCoE or iSCSI packet and sends it to I/O control-B. I/O control-B checks its priority information of the page from the page priority table (FIG. 9), and then creates an FCoE or iSCSI packet for the SCSI status command with the priority information "High" (see, e.g., FIG. 18 and FIG. 19). After that, I/O control-A creates an FCoE or iSCSI packet for SCSI DATA OUT with the priority information "High" (see, e.g., FIG. 18 and FIG. 19).

FIG. 18 shows an example of using FCoE. Each packet includes an Ether Header and an FCoE Header plus Payload. The priority information is stored in the Ether Header ("Priority 0" in one and "Priority 1" in another). The network priority table 112-09 shows columns of Priority, PGID (Priority Group ID), and Description. The network priority table 112-09 is used with the page priority table 112-07 to manage the priority information of each storage block address and allow priority enabled storage I/O networking.

FIG. 19 shows an example of packet format for iSCSI. Each packet includes an IP Header and an iSCSI Header plus Payload. The ToS (Type of Service) information is stored in the IP Header. The network priority table 112-09 includes columns of ToS, Bandwidth, and Delay.

Actual Configuration Examples

FIGS. 20, 21, and 22 show actual examples of system configuration for storage networking. FIG. 20 shows the storage networking between storage subsystems 100*a*, 100*b*, 100*c*. FIG. 21 shows the storage networking between server 200 and storage subsystem 100*a*. FIG. 22 shows the storage networking considering the storage I/O characteristics of server 200 and storage subsystems 100a, 100b, 100c. In this configuration, all data of LU1 on the storage subsystem 100a comes from LU1 of the storage subsystem 100b, and provides logical unit service to the server 200. This storage I/O should be "High" priority. On the other hand, LU1 on the storage subsystem 100a is replicated to LU1 on the storage subsystem 100c for backup. In this case, storage I/O for the replication can be "Low" priority because server-storage I/O is more important than backup storage I/O. This is one of the examples for changing storage networking feature by storage I/O characteristics.

Inconsistencies of Priority Information Between Initiator and Target

FIGS. 23a-24b illustrate ways to address inconsistencies of priority information between the initiator and the target each having its own page priority table. Inconsistency can occur when, for instance, the page of tier is moved in I/O control B (target) such that every I/O controller has its own page priority table. The priority policy 302-03 in the memory 302 (FIG. 4) of the management server 300 is used to resolve the inconsistency.

FIG. 23a shows an example of a flow diagram illustrating the I/O control process of the read operation for the target I/O control when the initiator and the target have priority information that may be different from one another. In step 112-03-h01, I/O control B or C (target) receives a SCSI read command with priority information from I/O control A (initiator). In step 112-03-h02, I/O control B or C finds the read targeted page from the volume management table, page allocation table, and RG/LDEV management table. It finds the priority information of the read targeted page (step 112-03-h03) and determines if the priority information of the read command in 112-03-h01 and the priority information of the read targeted page in 112-03-h03 are the same (step 112-03-h04). If yes, I/O control B or C sets the priority information to send as that found in 112-03-h03, i.e., target (step 112-03-h05). If no, I/O control B or C determines if the priority policy 302-03 in the memory 302 (FIG. 4) of the management server 300 is set to "target" in step 112-03-h06. If yes, the process goes to step 112-03-h05. If no, the process goes to step 112-03-h07, and I/O control B or C sets the priority information to send as that in the read command of 112-03-h01, i.e., initiator. After step 112-03-h05 or step 112-03-h06, I/O control B or C sends a SCSI status command with the priority information to the proper initiator I/O control (step 112-03-h08) and sends SCSI DATA IN with the priority information to the proper initiator I/O control (step 112-03-h09).

FIG. 23b shows an example of a flow diagram illustrating the I/O control process of the read operation for the initiator I/O control when the initiator and the target have priority information that may be different from one another. In step 112-03-i01, I/O control A (initiator) receives a SCSI read command. In step 112-03-i02, I/O control A finds the read targeted page from the volume management table, page allocation table, and RG/LDEV management table. It determines the priority information of the read targeted page (step 112-03-i03) and sends the SCSI read command with the priority information to the proper target I/O control (step 112-03-i04). The target I/O control will send the SCSI data. In step 112-03-i05, I/O control A receives the SCSI status and DATA IN from the target I/O control. In step 112-03-i06, I/O control A determines if the priority information of the read targeted page in step 112-03-i03 and the priority information received from the target I/O control in step 112-03-i05 are the same. If yes, the process ends. If no, I/O control A determines if the priority policy 302-03 in the memory 302 (FIG. 4) of the management server 300 is set to "target" in step 112-03-i07. If yes, the process goes to step 112-03-i08. If no, the process ends. In step 112-03-i08, I/O control A updates the page priority table at the initiator (I/O control A) based on that at the target and then the process ends.

FIG. 24a shows an example of a flow diagram illustrating the I/O control process of the write operation for the target I/O control when the initiator and the target have priority information that may be different from one another. In step 112-03-j01, I/O control B or C (target) receives a SCSI read command with priority information from I/O control A (initiator). In step 112-03-j02, I/O control B or C finds the read targeted page from the volume management table, page allocation table, and RG/LDEV management table. In step 112-03-j03, it determines the priority information of the write targeted page from the page priority table. In step 112-03-j04, it determines whether the priority of the write command in 112-03-j01 and the priority information from the page priority table in 112-03-j03 are the same. If yes, I/O control B or C sets the priority information to send as that found in 112-03-j03, i.e., target (step 112-03-j05). If no, I/O control B or C determines if the priority policy 302-03 in the memory 302 (FIG. 4) of the management server 300 is set to "target" in step 112-03-j06. If yes, the process goes to step 112-03-j05. If no, the process goes to step 112-03-j07, and I/O control B or C sets the priority information to send as that in the read command of 112-03-j01, i.e., initiator. After step 112-03-j05 or step 112-03-j06, I/O control B or C sends a SCSI status command with the determined priority information (at 112-03-j05 or 112-03-j07) to the proper initiator I/O control (step 112-03-j08).

FIG. 24b shows an example of a flow diagram illustrating the I/O control process of the write operation for the initiator I/O control when the initiator and the target have priority information that may be different from one another. In step 112-03-k01, I/O control A (initiator) receives a SCSI read command. In step 112-03-k02, I/O control A finds the write targeted page from the volume management table, page allocation table, and RG/LDEV management table. It finds the priority information of the write targeted page (step 112-03-k03), and sends the SCSI write command with the priority information to the proper target I/O control (step 112-03-k04). The target I/O control will send SCSI data. In step 112-03-k05, I/O control A receives the SCSI status with the priority information from the target I/O control. In step 112-03-k06, I/O control A determines if the priority information of the write targeted page in step 112-03-k03 and the priority information received from the target I/O control in step 112-03-k05 are the same. If yes, I/O control A sends the SCSI DATA OUT with the determined priority information to the proper target I/O control in step 112-03-k07. If no, I/O control A determines if the priority policy 302-03 in the memory 302 (FIG. 4) of the management server 300 is set to "target" in step 112-03-k08. If yes, I/O control A updates the page priority table at the initiator (I/O control A) based on that at the target in step 112-03-k09 and then proceeds to step 112-03-k07. If no, I/O control A proceeds to step 112-03-k07.

In FIGS. 23a-24b, the management server 300 is expected to send a message to notify the administrator if there is inconsistency of priority information between the initiator I/O control and the target I/O control. The administrator will then update the page priority table of the target (if the priority policy selects the page priority table of the initiator) or the initiator (if the priority policy selects the page priority table of the target) in some way (e.g., by changing tier, updating the page priority table manually, or the like).

Of course, the system configuration illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for providing a more efficient storage networking infrastructure for storage tier management. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage networking system comprising a plurality of subsystems coupled with a network, the plurality of subsystems including an initiator subsystem having an initiator I/O (input/output) control unit, and a plurality of target subsystems each having a target I/O control unit, wherein the initiator subsystem is configured to:
   place priority information in packet address of an I/O command packet, the priority information being based on a priority table;
   send the I/O command packet to one or more of the plurality of target I/O control units; and
   receive a return I/O packet from each of the target I/O control units that received the sent I/O command packet, the return I/O packet having the same priority information;
   wherein the priority information provided in the priority table is priority of storing I/O data; and
   wherein the I/O data is transferred according to the priority information placed in the packet address of the I/O command packet.

2. The storage networking system according to claim 1, wherein priority levels in the priority table are set based on characteristics of storage disks, and the priority level of each page relates to the storage characteristics of the storage disk to which the page is allocated.

3. The storage networking system according to claim 1, wherein the I/O command packet includes a read command and the return I/O packet includes data read from the target I/O control unit.

4. The storage networking system according to claim 1, wherein the I/O command packet includes a SCSI write command; and
   wherein, for each target I/O control unit that received the I/O command packet, the return I/O packet includes SCSI status information from the target I/O control unit, and in response to the SCSI status information, the initiator I/O control unit sends SCSI data to be written to the target I/O control unit.

5. The storage networking system according to claim 1, wherein the initiator subsystem sends the I/O command packet and receives the return I/O packet before placing the priority information in the packet address of the I/O command packet; and
   wherein, for each target I/O control unit that received the I/O command packet, the return I/O packet includes the priority information provided from the target I/O control unit, and the priority table is stored in the target subsystem.

6. The storage networking system according to claim 1, wherein the initiator subsystem sends the I/O command packet and receives the return I/O packet before placing the priority information in the packet address of the I/O command packet, and an initiator priority table is stored in the initiator subsystem;
   wherein, for each target I/O control unit that received the I/O command packet, the return I/O packet includes priority information provided from a target priority table which is stored in the target subsystem;
   wherein, for each target I/O control unit that received the I/O command packet, if there is inconsistency between the priority information at the initiator priority table and the priority information at the target priority table, the initiator I/O control unit checks a preset priority policy to determine whether to select the initiator priority table or the target priority table and, if the target priority table is selected, the initiator updates the initiator priority table based on the target priority table.

7. The storage networking system according to claim 1, wherein the I/O command packet includes a read command and the return I/O packet includes data read from the target I/O control unit.

8. The storage networking system according to claim 1, wherein the I/O command packet includes a SCSI write command; and wherein, for each target I/O control unit that received the I/O command packet, the return I/O packet includes SCSI status information from the target I/O control unit, and in response to the SCSI status information, the initiator I/O control unit sends SCSI data to be written to the target I/O control unit.

9. The storage networking system according to claim 1, wherein the priority information is placed in a header or a body of the I/O command packet.

10. The storage networking system according to claim 1, wherein the I/O command packet has a high priority for transferring the I/O command packet which is at least at high as a packet containing I/O data.

11. A storage networking method for a system which includes a plurality of subsystems coupled with a network, the plurality of subsystems including an initiator subsystem having an initiator I/O (input/output) control unit, and a plurality of target subsystems each having a target I/O control unit, the method comprising:

placing priority information in packet address of an I/O command packet, the priority information being based on a priority table;

sending the I/O command packet from the initiator I/O control unit to one or more of the plurality of target I/O control units; and receiving, by the initiator I/O control unit, a return I/O packet from each of the target I/O control units that received the sent I/O command packet, the return I/O packet having the same priority information;

wherein the priority information provided in the priority table is priority of storing I/O data; and wherein the I/O data is transferred according to the priority information placed in the packet address of the I/O command packet.

12. The storage networking method according to claim 11, wherein priority levels in the priority table are set based on characteristics of storage disks, and the priority level of each page relates to the storage characteristics of the storage disk to which the page is allocated.

13. The storage networking method according to claim 11, wherein the I/O command packet includes a read command and the return I/O packet includes data read from the target I/O control unit.

14. The storage networking method according to claim 11, wherein the I/O command packet includes a SCSI write command; and wherein, for each target I/O control unit that received the I/O command packet, the return I/O packet includes SCSI status information from the target I/O control unit, and in response to the SCSI status information, the method further comprises sending, from the initiator I/O control unit, SCSI data to be written to the target I/O control unit.

15. The storage networking method according to claim 11, wherein sending the I/O command packet and receiving the return I/O packet are performed before placing the priority information in the packet address of the I/O command packet; and wherein, for each target I/O control unit that received the I/O command packet, the return I/O packet includes the priority information provided from the target I/O control unit, and the priority table is stored in the target subsystem.

16. The storage networking method according to claim 11, wherein sending the I/O command packet and receiving the return I/O packet are performed before placing the priority information in the packet address of the I/O command packet, and an initiator priority table is stored in the initiator subsystem;

wherein, for each target I/O control unit that received the I/O command packet, the return I/O packet includes priority information provided from a target priority table which is stored in the target subsystem;

wherein, for each target I/O control unit that received the I/O command packet, if there is inconsistency between the priority information at the initiator priority table and the priority information at the target priority table, the method further comprises checking a preset priority policy to determine whether to select the initiator priority table or the target priority table and, if the target priority table is selected, updating the initiator priority table based on the target priority table.

17. The storage networking method according to claim 11, wherein the I/O command packet includes a read command and the return I/O packet includes data read from the target I/O control unit.

18. The storage networking method according to claim 11, wherein the I/O command packet includes a SCSI write command; and wherein, for each target I/O control unit that received the I/O command packet, the return I/O packet includes SCSI status information from the target I/O control unit, and in response to the SCSI status information, the method further comprises sending, from the initiator I/O control unit, SCSI data to be written to the target I/O control unit.

19. The storage networking method according to claim 11, wherein the priority information is placed in a header or a body of the I/O command packet.

20. The storage networking method according to claim 11, wherein the I/O command packet has a high priority for transferring the I/O command packet which is at least at high as a packet containing I/O data.

* * * * *